US006242013B1

(12) United States Patent
Luhman et al.

(10) Patent No.: US 6,242,013 B1
(45) Date of Patent: Jun. 5, 2001

(54) METHOD AND COMPOSITION FOR ENHANCING OLEIC ACID CONTENT OF MILK PRODUCED BY RUMINANTS

(75) Inventors: Cindie M. Luhman, Jewell; Ping Feng, West Des Moines, both of IA (US); Phil Kerr, Wildwood, MO (US)

(73) Assignees: Land O'Lakes, Inc., Arden Hills, MN (US); Optimum Quality Grains, LLC, West Des Moines, IA (US)

( * ) Notice: Subject to any disclaimer, the term of this patent is extended or adjusted under 35 U.S.C. 154(b) by 0 days.

(21) Appl. No.: 09/362,082

(22) Filed: Jul. 27, 1999

(51) Int. Cl.$^7$ ............................. A23K 1/18; A23C 9/20; A23C 15/00

(52) U.S. Cl. ..................... 426/2; 580/601; 580/623; 580/630; 580/807

(58) Field of Search ............................. 426/2, 623, 630, 426/807, 601, 580

(56) References Cited

U.S. PATENT DOCUMENTS

| | | | |
|---|---|---|---|
| 3,925,560 | 12/1975 | Scott et al. | 426/2 |
| 4,073,960 | 2/1978 | Scott et al. | 426/580 |
| 4,112,069 | 9/1978 | Huber | 424/93 |
| 4,118,513 | 10/1978 | Braund et al. | 426/2 |
| 4,169,843 | 10/1979 | Snyder | 260/409 |
| 4,627,192 | 12/1986 | Fick | 47/58 |
| 4,642,317 | 2/1987 | Palmquist et al. | 514/558 |
| 4,743,402 | 5/1988 | Fick | 260/412.2 |
| 4,826,694 | 5/1989 | McAskie | 426/74 |
| 4,853,233 | 8/1989 | McAskie | 426/74 |
| 4,868,001 | 9/1989 | Maruta | 426/623 |
| 5,004,728 | 4/1991 | Chalupa et al. | 514/12 |
| 5,143,737 | 9/1992 | Richardson | 426/2 |
| 5,145,695 | 9/1992 | Smith et al. | 426/2 |
| 5,182,126 | 1/1993 | Vinci et al. | 426/74 |
| 5,215,766 | 6/1993 | Schaub | 426/2 |
| 5,250,307 | 10/1993 | Cummings et al. | 426/72 |
| 5,378,477 | 1/1995 | Williams et al. | 426/2 |
| 5,380,893 | 1/1995 | Lajoie | 554/156 |
| 5,391,788 | 2/1995 | Vinci et al. | 554/156 |
| 5,416,115 | 5/1995 | Erdman et al. | 514/560 |
| 5,425,963 | 6/1995 | Lajoie | 426/2 |
| 5,496,571 | 3/1996 | Blagdon et al. | 426/2 |
| 5,503,112 | 4/1996 | Luhman et al. | 119/174 |
| 5,514,406 | 5/1996 | Aoe et al. | 426/606 |
| 5,585,134 | 12/1996 | Cummings et al. | 426/630 |
| 5,662,958 | 9/1997 | Kennelly et al. | 426/630 |
| 5,670,191 | 9/1997 | Cummings et al. | 426/2 |

(List continued on next page.)

FOREIGN PATENT DOCUMENTS

| | | |
|---|---|---|
| 0 998 853 A1 | 5/2000 | (EP) . |
| 2 113 521 | 8/1983 | (GB) . |
| WO 99/20123 | 4/1999 | (WO) . |

OTHER PUBLICATIONS

Lin et al., J. Food Sci., vol. 61 (1), pp. 24–27, 1996.*
Lin et al., Food Res. Int'l. vol. 29 (3/4), pp. 367–371, 1996.*
Middaugh et al., J. Dairy Sci., vol. 71, pp. 3179–3187, 1988.*
Tremblay et al., J. Dairy Sci., vol. 79 (2), pp. 276–282, 1996.*
Aldrich et al., J. Anim. Sci., vol. 73 (7), pp. 2131–2140, 1995.*
Casper, D.P., et al., Lactational Responses of Dairy Cows to Diets Containing Regular and High Oleic Acid Sunflower Seeds, Journal of Dairy Science, vol. 71, No. 5, pp. 1267–1274 (1988).
Harris, B. Jr., *Feeding Raw or Heat–Treated Whole Soybeans to Dairy Cattle*, DS 28, pp. 1–7, published by the Dairy Science Department, Florida Cooperative Extension Service, Institute of Food and Agricultural Sciences, University of Florida. Date first printed, Mar. 1990.
Selner, D. R., et al., Effects of Feeding Oleic Acid or Hydrogenated Vegetable Oils to Lactating Cows, Journal of Dairy Science, vol. 63, No. 8, pp. 1235–1241 (1980).
Luhman, Cindie M. and Feng, P., Abstract of: The Effects of High Oleic Acid Corn Grain or Soybeans on Milk Composition in Mid–lactation Holsteins, Abstract No. 1184 in Journal of Animal Science, vol. 76, Suppl. 1/J. Dairy Science, vol. 81, Suppl. Jan. 1998, p. 303.
Brochure from Optimum Quality Grains, L.L.C., entitled Product Profile: High Oleic Sunflower Oil, Available to the Public prior to Jul. 27, 1998 (1 page).
Brochure from Optimum Quality Grains, L.L.C., entitled Optimum High Oleic Soybean Oil, Better Food Right From the Start, Available to the Public prior to Jul. 27, 1998 (3 pages).
Brochure from Optimum Quality Grains, L.L.C., entitled Product Profile: Enhancing the Value of Food Ingredients, Available to the Public prior to Jul. 27, 1998 (1 page).
Brochure from Optimum Quality Grains, L.L.C., entitled Product Profile: Value–Enhanced Vegetable Oils, Available to the Public prior to Jul. 27, 1998 (2 pages).
Brochure from Pioneer Hi–Bred International, Inc., entitled A233HO, Available to the Public prior to Jul. 27, 1998 (2 pages).
Erdman, R.A. and Teter B. B., "The Role of Trans Fatty Acids in Diet Induced Milk Fat Depression in Dairy Cows", Journal of Dairy Science, vol 78, No. Suppl. 1, 1995, p. 229.
Schneider et al., "Feeding Calcium Salts of Fatty Acids to Lactating Cows", Journal of Dairy Science, vol. 71, 1988, pp. 2143–2150.

*Primary Examiner*—Chhaya D. Sayala
(74) *Attorney, Agent, or Firm*—Kinney & Lange

(57) ABSTRACT

A method of enhancing the oleic acid content of milk produced by a ruminant, the method including processing a high oleic material to form a ruminally-protected high oleic material that is resistant to degradation in the rumen of the ruminant, orally feeding the ruminally-protected high oleic material to the ruminant, and milking the ruminant to produce milk.

38 Claims, 2 Drawing Sheets

U.S. PATENT DOCUMENTS

| | | | |
|---|---|---|---|
| 5,720,970 | 2/1998 | Rode et al. | 424/438 |
| 5,770,247 | 6/1998 | Satter et al. | 426/2 |
| 5,789,001 | 8/1998 | Klopfenstein et al. | 426/2 |
| 5,849,348 | 12/1998 | Vinci et al. | 426/488 |
| 5,874,102 | 2/1999 | LaJoie et al. | 424/438 |
| 5,912,416 | 6/1999 | Weisker | 800/298 |

\* cited by examiner

METHOD AND COMPOSITION FOR ENHANCING OLEIC ACID CONTENT OF MILK PRODUCED BY RUMINANTS

BACKGROUND OF THE INVENTION

The present invention generally relates to a method and composition for enhancing the concentration of oleic acid in milk produced by ruminants. More particularly, the present invention relates to a feed composition that includes oilseed high in oleic acid content and to a method of using this feed composition to enhance the oleic acid content of milk produced by ruminants. Furthermore, the present invention relates to butter that is based upon milk produced by ruminants that are fed oilseed high in oleic acid.

It is generally known that feed compositions for ruminants may be manipulated to effect changes in the composition of milk produced by lactating ruminants. Considerable effort has been directed to modifying ruminant feeding regimens to enhance the concentration of oleic acid in milk produced by ruminants. Saturated fatty acids in milk and dairy products that are based upon milk contribute to adverse health effects, such as coronary heart disease and high blood pressure in humans. However, mono-unsaturated fatty acids, such as oleic acid, are believed to be nutritionally more favorable for the human diet. In addition, mono-unsaturated fatty acids, such as oleic acid, are more stable against oxidation than some other fatty acids and thereby reduce the tendencies of dairy products to become rancid.

The challenge is to create a feed material that is both high in oleic acid content and that, when orally fed to lactating ruminants, supports transfer of most, if not all, of the oleic acid content from the feed material to milk produced by the ruminant. A number of prior efforts have been directed at resolving this dilemma. Some have attempted to directly feed ruminants feed materials containing increased amounts or concentrations of unsaturated fatty acids, such as oleic acid. However, it has been determined that if the proportion of fat in the diet of cattle exceeds about five weight percent of the total feed, the fat has toxic effects upon microorganisms in the rumen of the ruminants. It appears that fat reduces the growth rate, or even kills, certain microorganisms which digest fiber in the rumen, thereby lowering fiber digestibility. Furthermore, it is known that triglycerides and free fatty acids can physically coat fibrous or cellulosic material in the rumen and inhibit fermentation of the fibrous or cellulosic material by the microorganisms in the rumen. This has an adverse effect on the total digestibility of the diet and has been found to at least sometimes reduce the yield of milk and milk fat by ruminants.

Other efforts directed toward increasing oleic acid content and concentration in milk produced by ruminants rely on coating or chemically altering lipids to make the lipids rumen-inert. For example, transformation of lipids to the calcium salt form has been attempted. However, calcium salts of lipids have been found to be unpalatable, at least to some ruminants. Thus, use of calcium salt forms of lipids may cause a net reduction in feed intake and thereby negatively effect milk production rates and milk fat production rates by ruminants. Still others have proposed treatment of oil-bearing substances, or even oilseeds, with formaldehyde to render the lipids contained therein rumen-inert. However, there are health concerns relating to this use of formaldehyde. Furthermore, formaldehyde is not approved by the United States Food and Drug Administration for this type of application in animal feeds.

Another approach involves feeding untreated sunflower seeds containing high concentrations of oleic acid. These seeds were administered in the untreated form, without being rendered rumen-inert, since saturated and monosaturated fats are believed to be less toxic to rumen microorganisms than polyunsaturated fats, and thus less likely to interfere with microorganism activity and, consequently, fiber digestibility in the rumen. However, these efforts were not entirely satisfactory, since the high oleic acid sunflower seed feeding regimen caused a reduction in the concentration of fat in milk produced by the ruminants, caused a reduction in the concentration of total solids in the milk produced by the ruminants, and caused a reduction in the dry matter intake by the ruminants.

Though the various ruminant feeding techniques that have been proposed and/or practiced over the years have enhanced the overall knowledge base with respect to ruminant feeding, these techniques have not adequately addressed the problem of how to most economically, efficiently, and effectively maximize the transfer of oleic acid to milk produced by ruminants, without adversely effecting ruminant feed intake and ruminant health and digestion. Therefore, a need still exists for an improved method and composition for feeding ruminants that enhances the transfer of oleic acid from the feed to milk produced by the ruminant, that enhances the overall concentration of milk fat in the milk produced ruminant, and that enhances the total solids content of milk produced by the ruminants. The method and composition of the present invention meets this unfulfilled need.

BRIEF SUMMARY OF THE INVENTION

The present invention includes a method of enhancing the oleic acid content of milk produced by a ruminant. The method includes processing a high oleic material to form a ruminally-protected high oleic material that is resistant to degradation in the rumen of the ruminant, orally feeding the ruminally-protected high oleic material to the ruminant, and milking the ruminant to produce milk. The present invention further includes a method of feeding a ruminant, a method of increasing the oleic acid content of butter, a milk product, and a butter product.

DETAILED DESCRIPTION

Figure 1:
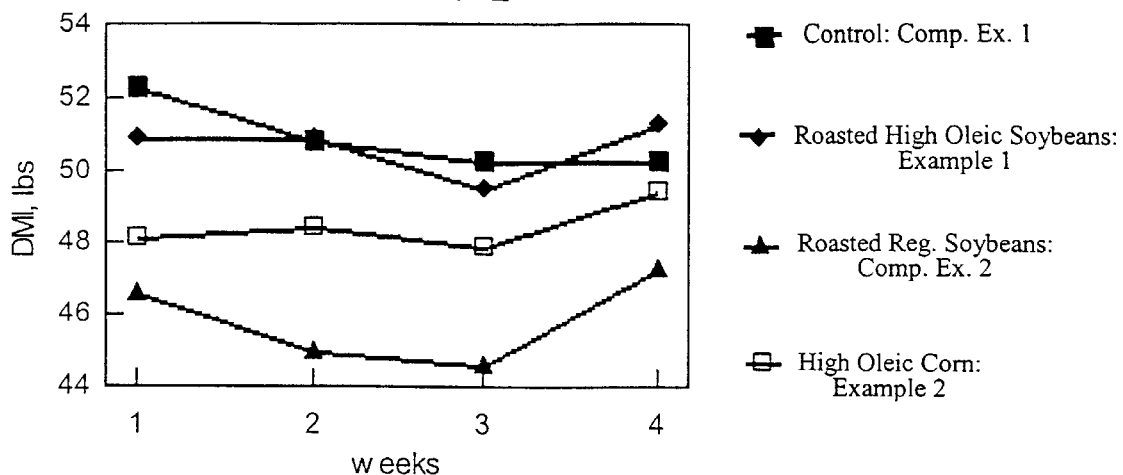
FIG. 1 is a graph depicting differences in dry matter intake by lactating cows fed a control ration, or the control ration along with regular soybeans, versus lactating cows fed the control ration, along with high oleic soybeans or high oleic corn, in accordance with the present invention.

The present invention generally relates to a method and composition for enhancing the concentration of oleic acid in milk produced by ruminants. More particularly, the present invention relates to a feed composition that includes oilseed high in oleic content and to a method of using this feed composition to enhance the oleic acid content of milk produced by ruminants. Furthermore, the present invention relates to butter that is based upon milk produced by ruminants that are fed oilseed high in oleic acid.

It has been surprisingly discovered that feeding ruminants ruminally-protected oilseeds, such as soybeans, that have a high oleic acid content, as compared to untreated high oleic oilseeds, such as untreated high oleic soybeans, the amount of milk produced by the ruminants, the concentration of fat in the produced milk, and the concentration of total solids, among other constituents, in the produced milk is increased. Furthermore, this feeding regimen of ruminally-protected high oleic oilseeds also causes the concentration of oleic acid, as well as the concentration of the cis-isomer form of oleic acid, to increase by at least 50% in milk produced by ruminants, as compared to feeding regimens that do not include ruminally-protected high olefin oilseeds. This is a surprising result, since orally fed rations of high oleic oilseeds that are not ruminally-protected actually cause a reduction of the fat concentration and total solids concentration in produced milk. Also, feeding of non-ruminally-protected high oleic oilseeds causes a smaller increase of the concentrations of oleic acid and the cis-isomer form of oleic acid in the produced milk, as compared to the feeding regimen of the present invention that includes ruminally-protected high oleic oilseeds.

As used herein, the term "ruminant" means an even-toed hoofed animal which has a complex 3-chamber or 4-chamber stomach and which typically rechews what it has previously swallowed. Some non-exhaustive examples of ruminants include cattle, sheep, goats, oxen, muskox, llamas, alpacas, guanicos, deer, bison, antelopes, camels, and giraffes.

As used herein, the term "ruminally-protected" means protected from alternation during passage through the rumen. By way of review, the digestive tract of a ruminant, such as a cow, includes a stomach that has four sections: (1) a rumen, (2) a reticulum, (3) an omasum, and (4) an abomasum. The four sections of the stomach can affect digestion of a component passing through the stomach because each section of the stomach serves a different function in the digestive process. In the rumen, food is mixed with saliva and then churned in a coordinated motion. The components of the food, if not ruminally-protected, typically undergo some fermentation and bacterial digestion in the rumen. The mixture of food and saliva then passes to the reticulum where the mixture is formed into a cud that can be regurgitated. After thorough chewing of the regurgitated cud, the cud is reswallowed and then passes from the rumen through the reticulum and into the omasum, if particle size restrictions are satisfied. While in the omasum, the mixture is additionally mixed to maintain it in a homogeneous state and to remove excess fluid. Then the homogeneous mixture is passed from the omasum to the abomasum where gastric digestion occurs.

As used herein, the term "high oleic oilseed," means an oilseed such as a soybean that, as grown and harvested, contains a higher concentration of oleic acid, as compared to regular oilseed. As used herein, the term "regular oilseed," means an oilseed that, as grown and harvested, contains some oleic acid, but not the elevated levels of oleic acid found in high oleic oilseeds. High oil grain and/or high oleic grain may be used in place of, or preferably along with, ruminally-protected high oleic oilseed to achieve benefits of the present invention. As used herein, the term "high oleic grain," means grain such as corn that, as grown and harvested, contains a higher concentration of oleic acid, as compared to regular grain, and preferably contains a higher percentage of oil, as compared to regular grain. As used herein, the term "high oil grain," means grain such as corn that, as grown and harvested, contains a higher percentage of oil, as compared to regular grain, and consequently contains a larger quantity of oleic acid, as compared to regular grain. As used herein, the term "regular grain," means grain that, as grown and harvested, contains some oil and some oleic acid in the oil, but not the elevated levels of oil found in high oil grain or the elevated levels of oleic acid found in high oil grain and in high oleic grain.

Ruminally-protected high oleic soybeans are one example of the ruminally-protected high oleic oilseed that may be employed in accordance with the present invention. As used herein, the term "high oleic soybean," means a soybean that, as grown and harvested, contains a higher concentration of oleic acid, as compared to regular soybeans. As used herein, the term "regular soybeans," means a soybean that, as grown and harvested, contains some oleic acid, but not the elevated levels of oleic acid found in high oleic soybeans. Regular soybeans typically contain about 17 to about 23 weight percent oil, based upon the total weight of the regular soybeans. The oleic acid concentration in the oil of regular soybeans typically ranges from about 22 weight percent to about 27 weight percent, based upon the total weight of the oil in the regular soybeans. The oleic acid concentration in the oil of high oleic soybeans is typically at least 50 weight percent, more preferably at least about 75 weight percent, and most preferably at least about 80 weight percent, based upon the total weight of the oil in the high oleic soybean. One preferred form of high oleic soybean is the A233HO soybean developed by Optimum Quality Grains, LLC. of West Des Moines, Iowa that is commercially available from Asgrow Seed Company of West Des Moines, Iowa. The oil of the A233HO soybean typically has the fatty acid composition set forth in Table 1 below:

TABLE 1

| COMPONENT | TYPICAL WEIGHT PERCENT* IN OIL OF HIGH OLEIC SOYBEAN |
|---|---|
| Palmitic Acid (C16:0) | 7 |
| Stearic Acid (C18:0) | 4 |
| Oleic Acid (C18:1) | 83 |
| Linoleic Acid (C18:2) | 3 |
| Linolenic Acid (C18:3) | 2 |

*based upon the total weight of the oil in the high oleic soybean

High oil corn and high oleic corn are two examples of the high oil grain and the high oleic grain, respectively, that may be employed in accordance with the present invention. The high oil corn and the high oleic corn may optionally be processed to a ruminally-protected form, but are typically not because it is it is difficult to form ruminally-protected high oil corn and ruminally-protected high oleic corn. High oil corn and high oleic corn typically have relatively low protein contents. The relatively low protein contents of high oil corn and high oleic corn typically make it difficult if not impossible for conventional technologies, such as roasting and non-enzymatic browning, to attain a meaningful level of ruminal protection for high oil corn and high oleic corn. Though the high oil corn and high oleic corn are not necessarily ruminally-protected, any high oil corn and any high oleic corn that are used as ruminant feed in accordance with the present invention are preferably fed to the ruminants in combination with ruminally-protected oilseed, such as ruminally-protected soybeans. The high oil corn and the high oleic corn may optionally be cracked into four to sixteen pieces per kernel, while avoiding grinding of the high oil corn and the high oleic corn that would release oil from the corn.

As used herein, the term "high oleic corn," means corn that, as grown and harvested, contains a higher concentration of oleic acid, as compared to regular corn, and preferably contains a higher percentage of oil, as compared to regular corn. As used herein, the term "high oil corn," means corn that, as grown and harvested, contains a higher percentage of oil, as compared to regular corn, and consequently contains a larger quantity of oleic acid, as compared to regular corn. As used herein, the term "regular corn," means corn that, as grown and harvested, contains some oil and some oleic acid in the oil, but not the elevated levels of oil found in high oil corn or the elevated levels of oleic acid found in high oil corn and in high oleic corn.

Regular corn typically contains about 2.5 to about 5.1 weight percent oil, based upon the total dry weight of regular corn. The oleic acid concentration in the oil of regular corn typically ranges from about 20 weight percent to about 30 weight percent, based upon the total weight of the oil in the regular corn. The oil content of high oil corn is typically greater than about 5.1 weight percent, based on the total dry matter weight of the high oil corn. The oil of high oil corn typically has the fatty acid composition set forth in Table 2 below:

TABLE 2

| COMPONENT | TYPICAL WEIGHT PERCENT* IN OIL OF REGULAR CORN | TYPICAL WEIGHT PERCENT** IN OIL OF HIGH OIL CORN | TYPICAL WEIGHT PERCENT*** IN OIL OF HIGH OLEIC CORN |
|---|---|---|---|
| Myristic (C14:0) | 0.0 | 0.0 | 0.0 |
| Myristoleic (C14:1) | 0.0 | 0.0 | 0.0 |
| Palmitic (C16:0) | 13.9 | 12.1 | 9.6 |
| Palmitoleic (C16:1) | 0.0 | 0.0 | 0.0 |
| Stearic Acid (C18:0) | 1.8 | 1.9 | 1.5 |
| Oleic Acid (C18:1) | 25.4 | 33.2 | 60.1 |
| Linoleic Acid (C18:2) | 57.7 | 51.6 | 27.6 |
| Linolenic Acid (C18:3) | 0.9 | 0.8 | 0.6 |
| Arachidic (C20:0) | 0.2 | 0.4 | 0.4 |
| Eicosenoic (C20:1) | 0.2 | 0.2 | 0.3 |

*based upon the total weight of the oil in the regular corn
**based upon the total weight of the oil in the high oil corn
***based upon the total weight of the oil in the high oleic corn The oleic acid concentration in the oil of high oil corn is typically at least about 25 weight percent, more preferably at least about 30 weight percent, and still more preferably at least about 33 weight percent, based upon the total weight of the oil in the high oil corn. One preferred form of high oil corn is any of the corn products available from the TopCross® line of high oil corn blends that were developed by Optimum Quality Grains, L.L.C. of West Des Moines, Iowa. The TOPCROSS® line of high oil corn blends are commercially available from Wyffels Hybrids, Inc. of Atkinson, Illinois and from Pfister Hybrid Corn Company of El Paso, Ill.

The oil content of the high oleic corn is preferably at least about 6.0 weight percent, or more, based on the total dry matter weight of the high oleic corn. The oil of high oleic corn typically has the fatty acid composition set forth in Table 2 above. The oleic acid concentration in the oil of high oleic corn is typically at least about 50 weight percent, more preferably at least about 60 weight percent, and most preferably at least about 64 weight percent, based upon the total weight of the oil in the high oleic corn.

The high oleic corn may be based upon a line of female seeds identified as B730L that is crossed with a line of male seeds identified as AEC272OL. Pollen of corn grown from the line of male seeds identified as AEC272OL pollinates kernels of corn grown from the line of female seeds identified as B730L to create corn seed that, when planted, produces high oleic corn. Seeds from the line of female seeds identified as B730L have been deposited at the American Type Culture Collection (ATCC) of Rockville, Md. 20852, USA under deposit accession number ATCC 97026. Seeds from the line of male seeds identified as AEC272OL have been deposited at the American Type Culture Collection under deposit accession number ATCC 97027.

Any conventional technique for ruminally protecting high oleic oilseeds may be employed to obtain ruminally-protected high oleic oilseeds for use in accordance with the present invention. Two examples of suitable techniques for ruminally protecting high oleic oilseeds are roasting and non-enzymatic browning that are discussed subsequently. All subsequent references to "high oleic oilseed" and "high oleic soybeans" are to be understood as referring to ruminally-protected forms of the "high oleic oilseed" and "high oleic soybeans," unless otherwise indicated.

Though high oleic oilseeds, high oil grains, and high oleic grains, generally, that are employed for feeding ruminants in accordance with the present invention will achieve beneficial results as compared to feeding ruminants regular oilseeds and regular grain, high oleic oilseeds, high oil grains, and high oleic grains are subsequently referred to primarily in terms of high oleic soybeans, high oil corn, and high oleic corn, respectively.

High oilseed(s), high oil grains, and/or high oleic grain(s) may be fed to ruminants either separately or in any combination with each other. Likewise, high oleic soybeans, high oil corn, and/or high oleic corn may be fed to ruminants either separately or in any combination with each other. For example, a feeding regimen could include high oleic soybeans, high oil corn, high oleic corn, or a combination of any of high oleic soybeans, high oil corn, and high oleic corn. Additionally, high oleic soybeans, high oil corn, and/or high oleic corn may be combined with other components to form a feed composition that is orally fed to the ruminant. Some non-exhaustive examples of such feed components include water; beans, such as regular soybeans; grains, such as regular corn; plant-based oils; plant-based meals, such as soybean meal and/or corn meal; animal-based protein meals, such as meat-based meal and bone meal; plant-based haylage and/or silage; plant-based syrup; fatty acids; commercially available formula feeds; vitamin and/or mineral supplements; and any mixture of any of these.

Some examples of suitable formula feeds include PEAK PLUS™ 37 formula feed, FRESH TRAN PLUS® formula feed, and CONDITION PLUS® formula feed that are each available from Land O'Lakes, Inc. of Arden Hills, Minnesota, and QLF® 4–19 formula feed that is available from Quality Liquid Feeds, Inc. of Dodgeville, Wis. Some examples of suitable vitamin and mineral additives include DAIRY SUPREME® trace mineral and vitamin premix formulation that is available from Land O'Lakes, Inc., dicalcium phosphate, salt, magnesium oxide, limestone, and any of these in any combination.

The high oleic soybeans that may be used in accordance with the present invention should be ruminally-protected and may be roasted to accomplish this ruminal protection prior to being orally fed to the ruminants. Roasting is typically accomplished with hot air, though any conventional roasting technique that ruminally protects fatty acid components, and preferably all fatty acid components, of high oleic oilseeds, and preferably also ruminally protects protein components of the high oleic oilseeds, may be employed for use in accordance with the present invention. The roasting may be preceded by heating with steam or by heating with steam along with hot steeping. In preparation for roasting either with or without steam heating and/or hot steeping, the high oleic soybeans may be cracked and screened to remove hulls. Cracking should break the soybeans into four to sixteen pieces.

The cracked high oleic soybeans may be roasted in a conventional roaster at a temperature varying between about 90° C. and 100° C., depending upon the amount of moisture evaporating from the cracked soybeans at any given time, for about 30 minutes. One suitable source of an acceptable roaster is Littleford Day, Inc. of Florence, Ky. Steam heating entails placing the cracked soybeans in a batch mixer, such as a batch mixer available from Littleford Day, Inc. Thereafter, water is added to the batch mixer and heated to about 100° C. by direct addition of steam. After the contents of the mixer reach about 100° C., the steamed soybeans are immediately transferred to the roaster for roasting in accordance with the conditions specified above. If steeping is conducted prior to roasting, the soybeans are transferred from the mixer to an insulated container for about 60 minutes. After the 60 minute steeping period is concluded, the soybeans are transferred to the roaster for roasting at the conditions specified above. The purpose of any roasting; roasting and steaming; or roasting, steeping, and steaming is to render the protein portion of the cracked high oleic soybean ruminally-protected to minimize, and preferably prevent, protein degradation in the rumen and to thereby prevent rumen degradation of the oleic acid that is contained in the high oleic soybeans.

Alternatively, the high oleic soybeans may be placed on a chain conveyor to a depth of about 4 to 5 inches and roasted at a temperature of about 600° F. to about 630° F. while progressing through an oven on the conveyor. The speed of travel of the roasting beans through the oven is controlled so that the temperature of the high oleic soybeans upon exiting the oven is about 300° F. After exiting the oven, the high oleic soybeans are be deposited in an insulated box to a depth of about 8 inches to about 12 inches for about 40 minutes to maintain the temperature of the high oleic soybeans at or above about 200° F. in the insulated box for at least about 30 minutes. After being removed from the insulated box, the roasted high oleic soybeans may be used whole for feeding ruminants or may be cracked into pieces, such as 4 to 16 pieces per soybean. The roasting renders the protein portion of the high oleic soybean ruminally-protected to minimize, and preferably prevent, protein degradation in the rumen and to thereby prevent rumen degradation of fatty acids, such as oleic acid, that are contained in the high oleic soybeans. Furthermore, the benefit of roasting the high oleic soybeans is not impaired by cracking the roasted high oleic soybeans into 4 to 16 pieces.

Alternatively, the high oleic soybeans may be non-enzymatically browned, instead of being roasted, to ruminally protect the high oleic soybeans and to thereby prevent rumen degradation of the oleic acid that is contained in the high oleic soybeans. Non-enzymatic browning is preferred over roasting, since the severity of heating required by roasting to achieve the desired level of rumen-undegradable protein may cause significant quantities of the nutrients in the roasted soybeans to be rendered undigestible by ruminants. The non-enzymatic browning may be conducted in accordance with the non-enzymatic browning details provided in U.S. Pat. No. 5,789,001 that issued on Aug. 4, 1998. Consequently, the entire disclosure of U.S. Pat. No. 5,789,001 is hereby incorporated by reference.

Non-enzymatic browning is produced by a condensation reaction between a protein and a reducing carbohydrate, such as a reducing sugar. The protein may be a protein such as those found to be useful in feeding livestock and commonly found in orthodox livestock feeds. The reducing carbohydrate is selected based upon its efficiency in reducing the selected proteins. The non-enzymatic browning reaction may be applied to oilseeds, such as soybeans, that include proteinaceous material surrounding fatty acids typically found in the form of oil in oilseeds. The non-enzymatic browning reaction renders the proteinaceous material resistant to bacterial degradation and thereby encapsulates the oil in a protective matrix. The encapsulated oil of the oilseed is consequently protected from degradation by bacteria in the rumen, such as hydrogenation by rumen bacteria, so that the oil is digestible post-ruminally. Furthermore, this encapsulation of the oil prevents the oil from inhibiting fiber digestion in the rumen.

In preparation for non-enzymatic browning, the cuticle of the oilseed is broken by mechanical cracking, using suitable equipment, such as a roller mill. Any method of breaking or cracking the cuticle may be employed as long as the breaking or cracking operation does not crush the oilseed and thereby avoids releasing the oil from the oilseed during the breaking or cracking process.

As an optional step, the oilseeds may be dried before or after cracking. This may be accomplished using hot air. The advantage to drying the cracked oilseeds prior to application of the reducing sugar solution is that the low moisture content of the dried cracked oilseed tends to draw the reducing sugar solution deeper into the interior of the cracked oilseed. However, drying increases production costs and is thus not essential to protecting the oil portion of the cracked oilseed.

After cracking and any optional drying, the cracked oilseed is treated with the reducing carbohydrate, such as reducing sugar, by applying the reducing carbohydrate, preferably in solution, in any conventional manner to the exterior of the cracked oilseed. For example, the reducing carbohydrate may be applied by spraying the solution, dripping the solution, or otherwise mixing the solution with the cracked oilseed. Thereafter, the applied reducing carbohydrates are caused to penetrate the interior of the cracked oilseed. This may be accomplished either with or without heat. If heat is not employed, the mixture of cracked oilseeds and the reducing carbohydrate is allowed to steep from about one minute to about one hour to ensure penetration of the reducing carbohydrate into the interior of the cracked oilseed.

Heat may also be utilized to promote penetration of the reducing carbohydrate into the oilseed. Steam is the preferred form of heat application. Heating with steam causes a net migration of moisture from the surface to the center of the cracked oilseed which thus promotes migration of the reducing carbohydrate into the interior of the cracked oilseed. This penetration of heat and reducing carbohydrate at the same time contributes to more uniform non-enzymatic browning throughout each particle of cracked oilseed. Thus, if the particles are thereafter ground, there is no loss of protein protection and the encapsulated oil thereby remains encapsulated and ruminally inert.

The more reactive the reducing carbohydrate is, the easier it is to form the reaction products of the protein and the reducing carbohydrate. Therefore, the reducing carbohydrate is preferably selected from reducing sugars, such as xylose, glucose, fructose, mannose, lactose, ribose, hemicellulose extracts, and any hydrolysates of any of these; sugars contained in spent sulfite liquor; molasses and hydrolysates of molasses; corn products and hydrolysates of corn products; and any mixture of any of these. Preferably, the reducing carbohydrate is a mixture of reducing sugars from an economical sugar source, such as spent sulfite liquor or dried spent sulfite liquor which is a by-product of the wood industry and is also a source of xylose.

Spent sulfite liquor is the portion of wood that is solubilized in acid sulfite pulping of hardwood and/or softwood plant material. The plant material is cooked at elevated temperatures at a pH of less than 7 in a solution of $MHSO_3$ where M is the cation, such as $NH_4^+$, $Na^+$, $Ca^{++}$, $Mg^{++}$ and $K^+$. Acid sulfite pulping is commonly used in making cellulose pulp for the manufacturer of paper products. Spent sulfite liquor are typically comprised of about 40% to abut 70% M-lignosulfonates, about 5% to about 30% reducing sugars, and about 2% to about 20% oligosaccharides. Spent sulfite liquor reducing sugars are typically a mixture comprised of glucose, mannose, xylose, galactose, and arabinose. The relative amount of each of the sugars in a particular batch of spent sulfite liquor varies depending upon the exact pulping conditions and the plant material used in the process.

Overall, the percentage of reducing carbohydrate may range from about 0.1 weight percent to about 40 weight percent, based upon the total weight of the mixture of the reducing carbohydrate and the cracked oilseed, depending upon the particular sugar and the particular cracked oilseed employed. Preferably, the concentration of reducing carbohydrate ranges from about 1 weight percent to about 5 weight percent, based upon the total weight of the mixture of reducing carbohydrate and the cracked oilseed. If xylose is used as the reducing carbohydrate, the concentration of xylose may be about 1 weight percent to about 6 weight percent, based upon the total weight of the xylose and the cracked oilseed. If glucose is used as the reducing carbohydrate, the concentration of glucose may range from about 2 weight percent to about 20 weight percent, based upon the total weight of the glucose and the cracked oilseed. The concentration of reducing carbohydrates in spent sulfite liquor typically ranges from about 10 weight percent to about 40 weight percent, based upon the total weight of the spent sulfite liquor. When dried spent sulfite liquor is employed to supply the required reducing carbohydrate, the concentration of dried spent sulfite liquor is typically about 2 weight percent to about 40 weight percent, based upon the total weight of the dried spent sulfite liquor and the cracked oilseed.

After the reducing carbohydrate, such as the reducing sugar, has been permitted to penetrate the cracked oilseed to the desired degree, the mixture of cracked oilseed and reducing carbohydrate is heated at a temperature, pH and moisture level for a sufficient amount of time to cause non-enzymatic browning to occur. Advantageously, the pH of the mixture during the non-enzymatic browning reaction ranges from about 2 to about 10.5 standard pH units. Also, the temperature of the mixture during the non-enzymatic browning reaction ranges from about 20° C. to about 150° C., with a range of 80° C. to 100° C. being preferred. The amount of moisture present during the reaction affects the reaction progress. Therefore, the percent moisture of the mixture should range from about 6 weight percent to about 40 weight percent, and preferably from about 15 weight percent to about 25 weight percent, based upon the total weight of the mixture of the cracked oilseed and reducing carbohydrate, to enhance the reaction progress.

If steeping is employed to promote migration of the reducing carbohydrate into the interior of the cracked oilseed, the non-enzymatic browning reaction may be promoted by roasting the mixture with hot air or by heating the mixture with steam. If steam is employed to promote penetration of the reducing carbohydrates into the cracked oilseed, heating with steam is thereafter maintained to result in non-enzymatic browning. Again, either roasting with hot air or heating with steam may be employed to promote non-enzymatic browning, but if steam is employed to cause penetration of the reducing carbohydrate, it is desirable to continue using steam to promote the non-enzymatic browning.

The non-enzymatic browning reaction includes at least some early Maillard reactions. The use of the early Maillard reaction to treat protein for use in feed is described in U.S. Pat. Nos. 4,957,748; 5,023,091; and 5,064,665, the disclosures of which are hereby fully incorporated by reference.

In the non-enzymatic browning reaction, the reducing carbohydrate and protein present in the cracked oilseed react to encapsulate the oil present in the cracked oilseeds in a protective matrix. The creation of the protective matrix thereby entails formation of a compartment of protected protein that contains the lipids. The lipid content of the compartment escapes degradation by rumen bacteria, though the protected protein and the protected lipids are digestible in the small intestine or abomasum of the ruminant.

The product resulting from the non-enzymatic browning reaction includes bodies of lipids ranging in size from about ½ micrometer to about 10 micrometers, depending upon the particular oilseed that is cracked and employed in the reaction. In the case of soybeans, the size range of the product of non-enzymatic browning is typically between about 0.5 and about 2 micrometers. The product of the non-enzymatic browning reaction includes bodies containing lipids in in situ natural form that are surrounded by a reaction product of protein and the reducing sugar. The concentration of the reaction product ranges from about 1 weight percent for peanuts to about 35 weight percent for soybeans, based upon the total weight of the reaction product and the protected lipid. The protein layer is more dense than the lipid layer and is also relatively thin, since the thickness of the protein layer is typically less than about 10% of the overall diameter of the cracked oilseed. Once the reaction product of the reducing carbohydrate and protein has been formed, the cracked soybeans may be ground to smaller particle size, since the protected particles in which protein encapsulates and protects lipids are so small that many remain intact, to provide a ground meal with ruminally-protected oil.

After the high oleic oilseed, high oil grain, and/or high oleic grain is fed to the ruminants, milk produced by the ruminants may be collected and processed for later sales as dairy products, such as pasturized milk, cheese, butter, sour cream, whipping cream, and/or yogurt. When roasted high oleic soybeans are orally fed to ruminants, it has been surprisingly found that the amount of milk produced by the ruminants, the concentration of fat in the produced milk, the concentration of lactose in the produced milk, and the concentration of total solids in the produced milk increases, as compared to when the ruminants are fed a feed composition that excludes roasted high oleic soybeans. Also, orally feeding ruminants roasted high oleic soybeans causes the milk produced by the ruminants to have a higher fat concentration, a higher protein concentration, and a higher total solids concentration, as compared to milk produced by ruminants that are fed roasted regular soybeans instead of roasted high oleic soybeans.

Additionally, orally feeding ruminants roasted high oleic soybeans causes the milk produced by ruminants to contain more than 50% more of the cis-isomer form of oleic acid and more than 50% more total oleic acid, as compared to milk produced by ruminants that are not fed any roasted high oleic soybeans. In addition, ruminants that are orally fed high oleic corn produce milk having an increased concentration of total fat, as compared to milk produced by ruminants that are not fed any high oleic corn.

The milk produced by ruminants fed high oleic oilseeds, high oil grain, and/or high oleic grain in accordance with the present invention may be formed into dairy products, such as pasturized milk, cheese, butter, sour cream, whipping cream, and/or yogurt butter by conventional dairy processes. For example, milk produced by ruminants fed high oleic oilseeds, high oil grain, and/or high oleic grain in accordance with the present invention may be processed to form butter in traditional butter crystallization equipment, such as a swept surface heat exchanger. One example of a suitable swept surface heat exchanger is the Votator® 672DE swept surface heat exchanger that is available from Waukesha Cherry-Burrell of Delavan, Wis. Alternatively, the milk that is produced by ruminants fed high oleic oilseed and/or high oleic grain in accordance with the present invention may be churned to form butter in batch processing equipment, such as a Hobart mixer that is available from Hobart Corporation of Troy, Ohio. No matter whether the butter is formed in batch processing equipment, such as the Hobart mixer, or continuous processing equipment, such as the swept surface heat exchanger, the milk is typically cooled to about 60° F. during processing to promote formation of the butter.

Surprisingly, dairy products, such as cheese, butter, sour cream, whipping cream, and yogurt, that are formed from milk produced by cattle fed roasted high oleic soybeans have a concentration of the cis-isomer form of oleic acid that is at least 50% greater than the cis-isomer form of high oleic acid in comparable dairy products that are made from milk produced by cattle that are not fed roasted high oleic soybeans. In addition, butter that is made from milk that is produced by cattle fed roasted high oleic oilseed, such as roasted high oleic soybeans; high oil grain, such as high oil corn; high oleic grain, such as high oleic corn; and/or non-enzymatically browned high oleic oilseeds, such as non-enzymatically browned soybeans, has been found to be softer and more spreadable at a particular temperature than butter that is made from milk produced by cows not fed any roasted high oleic oilseeds, high oil grain, high oleic grain, and/or non-enzymatically-browned oilseeds. In fact, butter that is made from milk that is produced by cattle fed non-enzymatically browned high oleic soybeans has a lower solid fat index (SFI) than even butter that is made from milk produced by cows that are fed roasted high oleic soybeans.

PROPERTY DETERMINATION & CHARACTERIZATION TECHNIQUES

Various analytical techniques are employed herein. An explanation of these techniques follows. All values presented in this document for a particular parameter, such as weight percent true protein, weight percent fat, weight percent lactose, weight percent non-protein nitrogen, and weight percent total solids, are based on the "as is" sample and are therefore on a "wet basis" unless otherwise specified herein.

Determining Dry Matter Weight

To determine the dry matter weight (or dry matter basis or dry basis) of a particular sample, the sample is first weighed. The weighed sample is then dried in an oven at a temperature that is adequate to drive off moisture from the sample without degrading the sample components, such as a temperature ranging from about 100° C. to about 110° C. The oven drying is continued until the weight of the dried sample remains constant, despite additional oven drying.

Determining Total Solids Content

To determine the weight percent total solids, wet basis, in a sample, the actual weight of total solids is determined by analyzing the sample in accordance with Method #925.23 (33.2.09) of Official Methods of Analysis, Association of Official Analytical Chemists (AOAC) (16th Ed., 1995). The weight percent total solids, wet basis, is then calculated by dividing the actual weight of total solids by the actual weight of the sample.

Determining Crude Protein Content

To determine the percent of total protein, wet basis, in a sample, the actual weight of total protein is determined in accordance with Method #991.20 (33.2.11) of *Official Methods of Analysis,* Association of Official Analytical Chemists (AOAC) (16th Ed., 1995). The value determined by the above method yields "total Kjeldahl nitrogen," which is equivalent to "total protein" since the above method incorporates a factor that accounts for the average amount of nitrogen in protein. Total Kjeldahl nitrogen and total protein are sometimes referred to in the dairy industry as "crude protein." Since any and all total Kjeldahl nitrogen determinations presented herein are based on the above method, the terms "total Kjeldahl nitrogen," "crude protein," and "total protein" are used interchangeably herein. Furthermore, those skilled in the art will recognize that the term "total Kjeldahl nitrogen" is generally used in the art to mean "crude protein" or "total protein" with the understanding that the factor has been applied. The weight percent total protein, wet basis, is calculated by dividing the actual weight of total protein by the actual weight of the sample.

The weight percent of true protein, wet basis, for a particular sample is calculated after first determining the wet basis weight percent of total Kjeldahl nitrogen and the wet basis weight percent of non-protein nitrogen in the sample. The wet basis weight percent of total Kjeldahl nitrogen in the sample is determined using the method referenced above. The wet basis weight percent of non-protein nitrogen (NPN) in the sample is determined in accordance with Method #991.21 (33.2.12) of *Official Methods of Analysis,* Association of Official Analytical Chemists (AOAC) (16th Ed., 1995). The weight percent of true protein, wet basis, in the sample is then determined by subtracting the wet basis weight percent of non-protein nitrogen in the sample from the wet basis weight percent of total Kjeldahl nitrogen in the sample.

Determining Lactose Content

To determine the weight percent lactose, wet basis, in a liquid sample, the weight of the liquid sample is first determined. The actual weight of lactose in the liquid sample may then be determined using analysis kit number 176-303, that is available from Boehringer-Mannheim of Indianapolis, Indiana in accordance with the procedural instructions included with analysis kit number 176-303. The weight percent lactose, wet basis, in the liquid sample is then calculated by dividing the actual weight of lactose in the liquid sample by the actual weight of the liquid sample.

Determining Total Fat Content

To determine the weight percent fat, wet basis, in a sample, the actual weight of fat in the sample is determined in accordance with Method #974.09 (33.7.18) of *Official Methods of Analysis,* Association of Official Analytical Chemists (AOAC) (16th Ed., 1995). The weight percent fat, wet basis, is then calculated by dividing the actual weight of fat in the sample by the actual weight of the sample.

Determining Solid Fat Index

The solid fat index (SFI) for a particular sample is determined in accordance with the following procedure. First, a sample of the fat is melted and the oil layer of the melted fat is filtered through Whatman #4, or equivalent, filter paper, into a 250 milliliter vacuum flask. Whatman #4 filter paper may be obtained from Whatman, Inc. of Fairfield, N.J. A solution of 1 weight percent potassium dichromate ($K_2Cr_2O_7$) indicator solution is prepared and then deaerated by vigorously boiling the indicator solution for 15 minutes at atmospheric pressure. The deaerated indicator solution is then cooled to room temperature before use.

Next, 2 milliliters of the deaerated indicator solution is pipetted into the dilatometer bulb of a calibrated dilatometer (item no. K-329300-0000) that is manufactured by Konts-Martin Company and that may be obtained from Fisher Scientific of Pittsburgh, Pa. After pipetting the indicator solution into the dilatometer bulb, the stopper is lubricated lightly with silicon grease and inserted into the dilatometer. The weight of the assembled dilatometer is then measured to the nearest 0.0001 gram and is documented as the tare weight.

The filtered, melted fat sample is heated to 80° C. and deaerated in a 250 milliliter vacuum flask at a pressure of 2 millimeters of mercury, or less, for at least 2 minutes and until no more gas bubbles are emitted from the sample. The deaerated fat sample is then carefully dispensed over the indicator solution in the dilatometer to near the top of the dilatometer bulb. The stopper is then inserted into the dilatometer so that the indicator solution rises approximately between the 950 and 1,150 marks on the scale of the dilatometer. The fat sample will overflow the bulb when doing this step. The fat is then washed from the outside surface of the dilatometer with petroleum ether under a fume hood. The excess fat is then wiped from the outer surface of the bulb and the dilatometer. The full dilatometer is then weighed and the weight is recorded as the full weight of the dilatometer after the ether has evaporated from the dilatometer.

The full dilatometer is then inserted to the 300 mark of the dilatometer in a 60° C. water bath. After 15 minutes, the level of the indicator solution in the dilatometer is read and recorded. The level of the indicator solution in the dilatometer is thereafter read and recorded at 5 minute intervals until the change in the level of the indicator solution in the dilatometer is less than 2 units in a period of 5 minutes. The 60° C. temperature of the water bath should be checked at the end of the thermal expansion determination. Significant variations indicate faulty technique that diminish the accuracy of the solid fat index determination.

The dilatometer is then transferred to a 37.8° C. water bath and immersed to the 300 mark on the dilatometer. The level of the indicator solution in the dilatometer is read and recorded at 5 minute intervals until the change in the level of the indicator solution in the dilatometer is less than 2 units in a 5 minute period. It is necessary for the fat sample to be completely melted at the lower temperature (37.8° C.). If any seeding or clouding of the sample occurs at the lower temperature, the sample must be remelted in a 60° C. water bath and the lower temperature is increased from 37.8° C. in the lower temperature water bath. Also, if the temperature of the lower temperature water bath is raised above 37.8° C., the correct temperature should be recorded on the worksheet and used in the calculations.

The dilatometer is then transferred to a 0° C. water bath and immersed to the 300 mark and held at this mark for 15 minutes to begin conditioning the sample. Thereafter, the dilatometer is transferred to a 26.7° C. water bath and immersed to the 300 mark on the dilatometer and held for 30 minutes. Then, the dilatometer is transferred back to the 0° C. water bath and held at the 300 mark on the dilatometer for 15 minutes.

The dilatometer is then transferred from the 0° C. water bath to a 10° C. water bath and immersed to the 300 mark on the dilatometer. After 30 minutes, the level of the indicator solution in the dilatometer is recorded. This step of the previous two sentences is then repeated in four different water baths that are held at 21.1° C., 26.7° C., 33.3° C., and 40.0° C., respectively. The dilatometer is then transferred to the 60° C. water bath and immersed to the 300 mark on the dilatometer to compare the level of the indicator solution in the dilatometer to the level of the indicator solution in the dilatometer when the dilatometer was first positioned in the 60° C. water bath to the 300 mark.

The correction value for each temperature specific reading is determined and recorded in accordance with correction values presented in Table 3 below:

TABLE 3

| | $V_c(T)$: FACTOR IN THERMAL EXPANSION EQUATION | | | | | |
|---|---|---|---|---|---|---|
| TEMPERA-TURE (° C.) | 900 Mark on Dilato-meter | 1000 Mark on Dilato-meter | 1100 Mark on Dilato-meter | 1200 Mark on Dilato-meter | 1300 Mark on Dilato-meter | 1400 Mark on Dilato-meter |
| 0 | 23.7 | 22.0 | 20.3 | 18.6 | 16.9 | 15.2 |
| 5 | 23.9 | 22.2 | 20.5 | 18.7 | 17.0 | 15.3 |
| 10 | 23.5 | 21.8 | 20.1 | 18.4 | 16.7 | 15.1 |
| 15 | 22.5 | 21.0 | 19.5 | 17.8 | 16.2 | 14.6 |
| 20 | 21.2 | 19.8 | 18.4 | 16.8 | 15.3 | 13.8 |
| 21.1 | 21.1 | 19.6 | 18.1 | 16.6 | 15.0 | 13.5 |
| 25 | 19.8 | 18.4 | 17.0 | 15.6 | 14.1 | 12.7 |
| 26.7 | 19.1 | 17.7 | 16.3 | 15.2 | 13.6 | 12.3 |
| 30 | 17.9 | 16.6 | 15.3 | 14.0 | 12.7 | 11.4 |
| 33.3 | 16.1 | 15.1 | 14.1 | 12.8 | 11.5 | 10.5 |
| 35 | 15.5 | 14.4 | 13.3 | 12.2 | 11.1 | 10.0 |
| 37.8 | 14.0 | 13.0 | 12.0 | 11.1 | 10.0 | 9.0 |
| 40 | 13.0 | 12.0 | 11.0 | 10.2 | 9.2 | 8.3 |
| 42 | 11.8 | 11.0 | 10.1 | 9.3 | 8.4 | 7.6 |
| 44 | 10.7 | 9.9 | 9.2 | 8.4 | 7.6 | 6.9 |
| 45 | 10.1 | 9.4 | 8.7 | 8.0 | 7.2 | 6.5 |
| 48 | 8.5 | 7.8 | 7.3 | 6.6 | 5.9 | 5.3 |
| 50 | 7.1 | 6.6 | 6.1 | 5.6 | 5.1 | 4.5 |
| 52 | 5.6 | 5.2 | 4.9 | 4.5 | 4.1 | 3.6 |

TABLE 3-continued

V_c(T): FACTOR IN THERMAL EXPANSION EQUATION

| TEMPERA-TURE (° C.) | 900 Mark on Dilato-meter | 1000 Mark on Dilato-meter | 1100 Mark on Dilato-meter | 1200 Mark on Dilato-meter | 1300 Mark on Dilato-meter | 1400 Mark on Dilato-meter |
|---|---|---|---|---|---|---|
| 53 | 4.9 | 4.6 | 4.2 | 3.9 | 3.5 | 3.2 |
| 55 | 3.4 | 3.2 | 3.0 | 2.8 | 2.5 | 2.3 |
| 60 | 0 | 0 | 0 | 0 | 0 | 0 |

The thermal expansion of the fat sample is then determined in accordance with the following thermal expansion (TE) formula:

$$TE = \frac{R(60) - R(T_{TE}) - V_c(T_{TE})}{W \times (60 - T_{TE})},$$

where $T_{TE}$ is the lower temperature (in ° C.) at which the thermal expansion reading was taken (usually 37.8° C.), where R(60) is the dilatometer reading in the 60° C. water bath, $R(T_{TE})$ is the dilatometer reading at the temperature $T_{TE}$, $V_c(T_{TE})$ is the volume correction at the temperature $T_{TE}$, and W is the weight of the fat sample included in the dilatometer. The weight of the fat sample is determined by subtracting the tare weight of the dilatometer bulb after the indicator solution has been added from the full weight of the dilatometer after the fat sample has been added to the dilatometer and any fat has been washed from the outside surface of the dilatometer.

The total dilation between particular temperatures $T_{SFI}$ and 60° C. is determined in accordance with the following formula:

$$\text{Total Dilation} = \frac{R(60) - R(T_{SFI}) - V_c(T_{SFI})}{W},$$

where $T_{SFI}$ is the temperature (in ° C.) (such as 21.1 ° C., 26.7° C., 33.3 ° C., and 40.0° C. where the particular solid fat index reading was taken, where R(60) is the dilatometer reading in the 60° C. water bath, $R(T_{SFI})$ is the dilatometer reading at the temperature $T_{SFI}$, $V_c(T_{SFI})$ is the volume correction from Table 3 above at the temperature $T_{SFI}$, and W is the weight of the fat sample included in the dilatometer. Thereafter, the solid fat index at each particular measurement temperature (SFI @ $T_{SFI}$) is determined in accordance with the following formula:

(SFI-@$T_{SFI}$)=(Total Dilation)−[(Thermal Expansion)×(60−$T_{SFI}$)]

Then, the solid fat index may be graphically reproduced as a plot of temperature versus solid fat concentration at particular measurement temperatures.

Determining Penetration Values

Penetration values for fat samples at different temperatures are determined in accordance with AOCS (American Oil Chemists' Society) Official Method No. Cc 16–60 (reapproved 1997), entitled Consistency Penetrometer Method. This method provides an arbitrary measure of the firmness of a fat by measuring the distance a given weight of defined shape will penetrate the fat in a certain amount of time. This method is applicable to plastic fats and solid fat emulsions, such as shortenings, butter, margarine, and similar products.

Determining Fatty Acid Profile (Land O'Lakes Laboratoiy Procedure)

The Land O'Lakes analytical laboratory uses the procedure that is set forth below to profile the fatty acid content of a fat sample. This method does not separate the various isomers of the particular unsaturated fatty acid chains. According to this method, triglycerides are derivatized to methyl esters. The resulting esters are then extracted into hexane. A portion of the hexane is then analyzed using capillary gas chromatography.

Supplies and Reagent Preparation.

Low total organic carbon (TOC<5 ppb) deionized water is prepared using the MILLIQ® UV Plus laboratory water system that is available from Millipore Corporation of Bedford, Mass. Methyl ester reference standard GLC 448 that is available from Nu-Chek-Prep, Inc. of Elysian, Minn. is used in this analysis. The concentrations and approximate retention times of particular methyl esters that are included in this standard are provided in Table 4 below:

TABLE 4

Concentrations and Approximate Retention Times of Particular in Methyl Esters in Methyl Ester Reference Standard GLC 448

| FATTY ACID (Methyl Ester) | WEIGHT PERCENT* | RETENTION TIME (MINUTES) |
|---|---|---|
| Butyric Acid(C4:0) | 2.0 | 2.69 |
| Caproic Acid (C6:0) | 2.0 | 4.93 |
| Caprylic Acid (C8:0) | 2.0 | 6.64 |
| Capric Acid (C10:0) | 2.0 | 8.06 |
| Lauric Acid (C12:0) | 2.0 | 9.71 |
| Myristic Acid (C14:0) | 2.0 | 12.71 |
| Myristoleic Acid (C14:1) | 2.0 | 13.38 |
| Pentadecanoic Acid (C15:0) | 2.0 | 15.25 |
| Palmitic Acid (C16:0) | 12.0 | 18.23 |
| Palmitoleic Acid (C16:1) | 2.0 | 18.78 |
| Heptadecanoic Acid (C17:0) | 2.0 | 21.02 |
| Acid (C17:1) | 2.0 | 21.58 |
| Stearic Acid (C18:0) | 2.0 | 23.73 |
| Trans-isomer of Oleic Acid (C18:1) | 2.0 | 24.14 |
| Cis-isomer of Oleic Acid (C18:1) | 25.0 | 24.14 |
| Trans-isomer of Linoleic Acid (C18:2) | 2.0 | 25.05 |
| Cis-isomer of Linoleic Acid (C18:2) | 25.0 | 25.05 |
| Linolenic Acid(C18:3) | 2.0 | 26.15 |
| Arachidic Acid (C20:0) | 2.0 | 28.94 |
| Lesquerolic Acid (C20:1) | 2.0 | 29.42 |
| Behenic Acid (C22:0) | 2.0 | 36.46 |
| Lignoceric Acid (C24:0) | 2.0 | 45.68 |

*based upon the total weight of the Methyl Ester Reference Standard GLC 448

The methyl ester reference standard must be stored in sealed vials in a freezer at less than 0° C. This fatty acid profiling method employs a DB-225 gas chromatograph column that may be obtained from J & W Scientific Incorporated of Folsom, Calif. The DB-225 gas chromatograph column is 15 meters long, has an inside diameter of 0.53 millimeters, and has a 1 μm film thickness. The DB-225 gas chromatograph column is employed in combination with the gas chromatograph that is equipped with a flame ionization detector and a data acquisition system and associated software.

This fatty acid profiling technique requires the use of the following three reagents. First, a 0.5 N methanolic solution of potassium hydroxide (KOH) is prepared by dissolving 14 grams of KOH into 500 milliliters of methanol. Then, a saturated solution of sodium chloride is prepared by mixing sodium chloride to water obtained from the MILLIQR® UV plus laboratory water system until the salt solution is saturated. Finally, a diluted methyl ester standard is prepared by filling a high pressure liquid chromatography (HPLC) vial with hexane. The hexane-filled vial is placed in the freezer and cooled to the temperature of the freezer. Next, a similarly cooled ampoule of the GLC 448 methyl ester reference standard is opened and the contents of this ampoule are transferred into the cool vial of hexane. The vial is then capped and gently mixed until the esters have dissolved. Thereafter, the vial is placed back into the freezer. After cooling, a portion of the hexane/GLC 448 ethyl ester reference standard is transferred into a cooled gas chromatography autosampler vial.

Preparation of Fat Sample

For each fatty acid profiling run, a check sample and a reagent blank should be analyzed. If possible, duplicate samples of the fat should be profiled for fatty acid components according to this procedure. Suitable examples of check samples include an AOCS (American Oil Chemists' Society) Smalley check sample from the GC series and a butter fat sample.

To begin the analysis, 100 milligrams of the fat sample are first placed in the bottom of a purge and trap vial or a screw cap test tube. To assure that a representative subsample of the fat is taken, the fat should be fully melted before weighing out the 100 milligram sample. If the fat was obtained by the Mojonnier method, the 100 milligram sample of fat should be dissolved in a couple of milliliters of chloroform in a pan. The mixture of chloroform and the fat sample is then transferred to the trap vial or screw cap test tube.

Four milliliters of the 0.5 normal KOH reagent is added to the vial containing the 100 milligram fat sample. The vial is then capped and mixed. Thereafter, the vial is placed in a 60° F. water bath for 10 minutes, while swirling the vial every couple of minutes.

The vial is then placed in an ice bath and then allowed to cool for approximately 15 minutes. Thereafter, 5 milliliters of a solution of 14 weight percent boron trifluoride ($BF_3$) in methanol is added to the vial. The vial is immediately capped, gently swirled, and placed back into the 60° C. water bath. After nine minutes in the water bath, the vial is returned to the ice bath to cool for 15 minutes. Then, 5 milliliters of cooled hexane is added to the vial for each 100 milligram sample of fat being analyzed. The vial is immediately capped and inverted six times. Thereafter, the vial is placed the 60° C. water bath for about three minutes and is then placed into the ice bath and cooled for about 15 minutes.

After cooling, cooled saturated sodium chloride solution is added to the vial until the vial is approximately half full. The vial is recapped, gently inverted six times, and then placed back into the ice bath. After a 15 minute cooling period in the ice bath, a portion of the clear hexane layer is transferred from the vial into a previously cooled gas chromatography autosampler vial. A sufficient amount of the hexane extract is added so that there is a minimum amount of headspace left inside of the autosampler vial.

If the hexane layer in the vial is cloudy, the extract will need to be dried with sodium sulfate ($NaSO_4$). This is accomplished by placing a small amount of dried sodium sulfate into a HPLC vial. The vial is then cooled and a portion of the cloudy hexane layer is transferred to the cooled vial containing the dried sodium sulfate. The vial is filled so that there is a minimum amount of headspace in the vial. The contents are mixed and the clear hexane that results is then transferred to the cooled gas chromatography autosampler vial.

Gas Chromatograph Analysis

Prior to running the fatty acid profile analysis, the gas chromatograph equipment is set up as directed in the instrument manual accompanying the gas chromatograph. The gas chromatograph system is adjusted to (1) set the flow rate of helium at 3 milliliters per minute, (2) set the injection volume at $1\mu l$, (3) set the injection port temperature at 225° C., (4) set the split ratio at 150:3, and set the septum purge at 3 milliliter per minute. The oven of the gas chromatography equipment is programmed to (1) initially ramp from 40° C. to 160° C. at a rate of 20° C. per minute, (2) then ramp from 160° C. to 200° C. at a rate of 3.5° C. per minute, and (3) then finally ramp from 200° C. to 220° C. at a rate of 1° C. per minute. The oven is programmed to hold at 40° C. for two minutes, to hold at 160° C. for seven minutes, and to hold at 200° C. for five minutes. Finally, the detector temperature of the gas chromatograph equipment should be set at 280° C. with appropriate adjustment of the range to ensure that the signal will not overload the detector.

The gas chromatograph is conditioned by injecting some of the GLC 448 methyl ester reference standard while performing the oven program set forth in the previous paragraph. After the setup steps have been taken, the autosampler vials containing the original of the fat sample, the duplicate of the fat sample, and the methyl ester reference standard are placed in the autosampler tray of the gas chromatograph. A secondary standard is run every twenty samples and at the end of each run. The data acquisition system is set up as directed in the appropriate equipment manuals and the gas chromatograph instrument is then operated according to the instrument operating instructions accompanying the gas chromatograph equipment to obtain chromatograms for individual fatty acid ethers in each of the samples and the reference standard.

From the chromatograms that are obtained for the samples and standards of the vials placed in the autosampler tray, the individual fatty acid esters are identified by retention time and quantification is based upon the relative size of the respective peak areas. If resolution is not sufficient in the chromatogram, the samples are rerun using a 1:10 dilution of the samples to achieve better resolutions between peaks. The order of elution of individual fatty acid esters in Methyl Ester Reference Standard GLC 448 is set forth in Table 4 above.

Using the known weight percent of the individual fatty acid esters in the GLC 448 methyl ester reference standard, a calibration curve is generated based upon an internal standardization (normalization). This internal standardization may be accomplished by the data system in accordance with the instruction manual accompanying the data system. When calibrating the gas chromatograph, the GLC 448 methyl ester reference standard is known to contain 27 weight percent oleic acid (C18:1) and 27 weight percent linoleic acid (C18:2), based upon the total weight of the GLC 448 methyl ester reference standard. After completing the internal standardization, the normalized percentages of the individual fatty acids are determined using the data system.

The detection limit using this procedure for each individual fatty acid is 0.1 weight percent. For purposes of significant figures, all percentages are rounded to the nearest tenth. Duplicate samples should have results for major components with relative percent deviations from the original sample of ±10 weight percent. The weight percent determined for each individual fatty acid should be approximately equal to the percent of the area associated with each peak on the chromatogram. However, fatty acids with lower molecular weights may deviate from this rule to some extent.

Determining Fatty Acid Profile

(Optimum Quality Grain Laboratory Procedure)

The Optimum Quality Grain analytical laboratory uses the procedure that is set forth below to profile the fatty acid content of fat samples. This method does separate isomers of particular unsaturated fatty acid chains. According to this method, triglycerides are derivatized to methyl esters. The resulting esters are then extracted in to hexane. A portion of the hexane is then analyzed using capillary gas chromatography.

Supplies and Reagent Preparation.

Low total organic carbon (TOC<5 ppb) deionized water is obtained for use during the analysis. Methyl ester reference standard GLC 463 and methyl conjugated linoleate reference standard UC-59-M that are each available from Nu-Chek-Prep, Inc. of Elysian, Minn. are used in this analysis. The concentrations of particular methyl esters that are included in the GLC-463 reference standard are provided in Table 5 below:

TABLE 5

Concentrations of Particular Methyl Esters in Reference Standard GLC 463

| FATTY ACID (Methyl Ester) | WEIGHT PERCENT* |
|---|---|
| Methyl Butyrate (C4:0) | 1.0 |
| Methyl Pentanoate (C5:0) | 1.0 |
| Methyl Capronate (C6:0) | 1.0 |
| Methyl Heptanoate (C7:0) | 1.0 |
| Methyl Caprylate (C8:0) | 2.0 |
| Methyl Nonanoate (C9:0) | 1.0 |
| Methyl Caprate (C10:0) | 2.0 |
| Methyl Undecanoate (C11:0) | 1.0 |
| Methyl Undecenoate (C11:1) | 1.0 |
| Methyl Laurate (C12:0) | 4.0 |
| Methyl Dodecenoate (C12:1) | 2.0 |
| Methyl Tridecanoate (C13:0) | 1.0 |
| Methyl Tridecenoate (C13:1) | 1.0 |
| Methyl Myristate (C14:0) | 4.0 |
| Methyl Myristoleate (C14:1) | 2.0 |
| Methyl Pentadecanoate (C15:0) | 1.0 |
| Methyl Pentadecenoate (C15:1) | 1.0 |
| Methyl Palmitate (C16:0) | 4.0 |
| Methyl Palmitoleate (C16:1) | 4.0 |
| Methyl Palmitelaidate (C16:1 trans) | 1.0 |
| Methyl Heptadecanoate (C17:0) | 2.0 |
| Methyl 10-Heptadecenoate (C17:1) | 2.0 |
| Methyl Stearate (C18:0) | 4.0 |
| Methyl Oleate (C18:1) | 4.0 |
| Methyl Elaidate (C18:1 trans) | 1.0 |
| Methyl Petroselinate (C18:1) | 1.0 |
| Methyl Vaccenate (C18:1) | 1.0 |
| Methyl Transvaccenate (C18:1 trans) | 1.0 |
| Methyl Linoleate (C18:2) | 4.0 |
| Methyl Linoelaidate (C18:2 trans) | 2.0 |
| Methyl Gamma Linolenate (C18:3) | 1.0 |
| Methyl Nonadecanoate (C19:0) | 1.0 |
| Methyl 7-Nonadecenoate (C19:1) | 1.0 |
| Methyl Linolenate (C18:3) | 4.0 |
| Methyl Arachidate (C20:0) | 4.0 |
| Methyl 5-Eicosenoate (C20:1) | 2.0 |

TABLE 5-continued

Concentrations of Particular Methyl Esters in Reference Standard GLC 463

| FATTY ACID (Methyl Ester) | WEIGHT PERCENT* |
|---|---|
| Methyl 8-Eicosenoate (C20:1) | 2.0 |
| Methyl 11-Eicosenoate (C20:1) | 2.0 |
| Methyl 11–14 Eicosadienoate (C20:2) | 2.0 |
| Methyl Homogamma Linolenate (C20:3) | 1.0 |
| Methyl Arachidonate (C20:4) | 1.0 |
| Methyl Eicosatrienoate (C20:3) | 2.0 |
| Methyl Behenate (C22:0) | 2.0 |
| Methyl Erucate (C22:1) | 4.0 |
| Methyl Eicosapentaenoate (C20:5) | 2.0 |
| Methyl Docosadienoate (C22:2) | 1.0 |
| Methyl Docosatrienoate (C22:3) | 2.0 |
| Methyl Docosatetraenoate (C22:4) | 1.0 |
| Methyl Lignocerate (C24:0) | 2.0 |
| Methyl Docosapentaenoate (C22:5) | 2.0 |
| Methyl Doeosahexaenoate (C22:6) | 2.0 |
| Methyl Nervonate C24:1) | 1.0 |

*based upon the total weight of the Methyl Ester Reference Standard GLC 463

The GLC 463 reference standard and the UC-59-M reference standard must be stored in sealed vials in a freezer at less than 0° C. This fatty acid profiling method employs a SP-2560 gas chromatograph column that may be obtained from SUPELCO of Bellefont, Pa. The SP-2560 gas chromatograph column is 100 meters long, has an inside diameter of 0.25 millimeters, and has a 0.2 μm film thickness. The SP-2560 gas chromatograph column is employed in combination with the gas chromatograph that is equipped with a flame ionization detector and a data acquisition system and associated software.

This fatty acid profiling technique requires the use of the following three reagents. First, the 10 weight percent solution of acetic acid is prepared by diluting 20 milliliters of glacial acetic acid to 200 milliliters using deionized water. Next. A 10 weight percent sodium methoxide solution is prepared by adding 140 milliliters of methanol to 70 milliliters of 30 weight percent sodium methoxide. Finally, a 50:50 ether/n-hexane solution is prepared by combining 750 milliliters of petroleum ether and 750 milliliters of n-hexane. After being combined, 50:50 ether/n-hexane solution is allowed to come to room temperature.

A dilute methyl ester standard is prepared after first filling a high pressure liquid chromatography (HPLC) vial with hexane. The hexane filled vial is then placed in a freezer and cooled to the temperature of the freezer. Next, a similarly cooled ampoule of the GLC 463 methyl ester reference standard is opened and the contents of this ampoule are transferred into the cool vial of hexane. The vial containing the hexane and GLC 463 methyl ester reference standard is then capped and gently mixed until the esters have dissolved. Thereafter, the vial is placed back into the freezer. After cooling, a portion of the mixture of hexane and the GLC 463 methyl ester reference standard is transferred into a cooled gas chromatography autosampler vial.

Next, a dilute methyl conjugated linoleate standard is prepared by filling another HPLC vial with hexane. This hexane-filled vial is placed in the freezer and cooled to the temperature of the freezer. Next, a similarly cooled ampoule of the UC-59-M reference standard is opened and the contents of this ampoule are transferred into the cooled vial of hexane. The vial containing the hexane and UC-59-M reference standard is then capped and gently mixed until the esters have dissolved. Thereafter, this vial is placed back into the freezer. After cooling, a portion of the mixture of hexane and the UC-59-M reference standard is transferred into another cooled gas chromatography autosampler vial.

Preparation of Fat Sample

For each fatty acid profiling run, a check sample and a reagent blank should be analyzed. If possible, duplicate samples of the fat should be profiled for fatty acid components according to this procedure. Suitable examples of check samples include an AOCS (American Oil Chemists' Society) Smalley check sample from the GC series.

To begin the analysis, 2.0 (±0.05) milliliters of the fat sample are placed into a 13×100 test tube that is designated as an "aqueous" tube. When the source of the sample is milk, the sample should be taken from the cream layer of the milk, since relative values are being measured. If the sample is solid (i.e., butter or cheese), the size of the sample should be changed to include 0.1 (±0.02) grams of fat. Thereafter, the volume in the aqueous test tube is made up to total 2.0 milliliters using deionized water.

Next, 20. milliliters of absolute anhydrous ethanol and 500 $\mu$L of 1.0 normal sulphuric acid ($H_2SO_4$) are added to the fat sample in the "aqueous" test tube. Then, 2.5 milliliters of the previously prepared 50:50 ether/n-hexane mixture are accurately aliquoted into the "aqueous" test tube. The "aqueous" test tube is then capped and shaken or vortexed briefly (about 5 to about 10 seconds).

A rotator rack with a convenient number of sealed test tubes is loaded to include the "aqueous" test tube that has been capped and is rotated for at least 5 minutes on a setting between 3 and 4. The rack is then unloaded and a refrigerated (to 4° C.) centrifuge is loaded with an even (balanced) number of sealed test tubes that include the "aqueous" test tube. The centrifuge is then allowed to spin until a speed of 3,500 RPM has been achieved. The refrigerated centrifuge is allowed to spin at the 3,500 RPM speed for an additional four minutes and is then allowed to spin down to a stop. The "aqueous" test tube is removed from the refrigerated centrifuge. Then, using a pasteur pipette, the organic layer is drawn out of the "aqueous" test tube and is transferred into a 16×100 test tube that has been labeled as "organic."

The steps in the previous two paragraphs are repeated two more times. Each time, the top (organic) layer or the liquid in the "aqueous" test tube is transferred into the 16×100 "organic" test tube using the pasteur pipette. Thus, after repeating this procedure a total of three times, the fat sample has been extracted with a total of the aliquots of organic liquid (2.5 milliliters each).

Next, 1.0 milliliter of the 10 weight percent sodium methoxide solution is accurately aliquoted into the 16×100 "organic" test tube. The "organic" test tube is then capped and loaded onto the rotator rack and balanced with a convenient number of sealed test tubes. The rotator rack is rotated for a total of about 5 minutes on a setting between 3 and 4. While leaving the "organic" test tube on the rack, excess sodium methoxide is neutralized by adding 1 milliliter of 10 weight percent acetic acid solution into the "organic" test tube. The "organic" test tube is then recapped and rotated on the rotator rack for at least 5 minutes on a setting between 3 and 4.

When the solution in the "organic" test tube is clear, about 1 milliliter of the top (organic) layer in the "organic" test tube is transferred to a gas chromatograph autosampler vial. A sufficient amount of the organic layer is added so that there is a minimum amount of head space left inside of the autosampler vial.

If the solution in the "organic" test tube is cloudy, the "organic" test tube is recapped and centrifuged in the refrigerated (to 4° C.) centrifuge for about four minutes at 3,500 RPM. Thereafter, approximately 1 milliliter of the top "organic" layer is transferred from the "organic" test tube and transferred to the gas chromatograph autosampler vial. If particulate is present in the "organic" test tube, the top (organic) layer of the fluid in the "organic" test tube is filtered through 0.2 $\mu$m Teflon filter, and about 1.0 milliliters of the filtrate is then transferred to the autosampler vial while minimizing head space in the autosampler vial.

Gas Chromatograph Analysis

Prior to running the fatty acid profile analysis, the gas chromatograph equipment is set up as directed in the instrument manual accompanying the gas chromatograph. The gas chromatograph system is adjusted to (1) set the flow rate of helium purge gas at 21.4 milliliters per minute (total flow in the gas chromatograph is less 22.7 milliliters per minute), (2) set the injection volume at 10 $\mu$l, (3) set the injection port temperature at 250° C, (4) set the split ratio at 25:1, and set the septum purge rate at 1.8 mL per minute. The oven of the gas chromatograph equipment is programmed to (1) initially ramp from 40° C. to 160° C. at a rate of 20° C. per minute, (2) then ramp from 160° C. to 200° C. at a rate of 3.5° C. per minute, (3) then finally ramp from 200° C. to 220° C. at a rate of 1 ° C. per minute. The oven is programmed to hold at 40° C. for two minutes, to hold at 160° C. for seven minutes, and to hold at 200° C. for five minutes. Finally, the detector temperature of the gas chromatograph equipment should be set at 280° C. with appropriate adjustment of the range to ensure that the signal will not overload the detector.

The gas chromatograph is conditioned by injecting some of the GLC 463 methyl ester reference standard while performing the oven program set forth in the previous paragraph. After the set up steps have been taken, the autosampler vials containing the original of the fat sample, the duplicate of the fat sample, the hexane-diluted sample of the GLC 463 reference standard, and the hexane-diluted sample of the UC-59-M reference standard are placed in the autosampler tray of the gas chromatograph. A secondary standard is run every 20 samples and at the end of each run. The data acquisition system is set up as directed in the appropriate equipment manuals and the gas chromatograph instrument is then operated according to the instrument operating instructions accompanying the gas chromatograph equipment to obtain chromatograms for individual fatty acid esters in each of the samples and each of the hexane-diluted samples of the reference standards.

From the chromatograms that are obtained for the samples and for the hexane-diluted standards, the individual fatty acid esters are identified by retention time and quantification is based upon the relative size of the respective peak areas. If resolution is insufficient in the chromatogram, the samples are rerun using a 1:10 dilution of the samples to achieve better resolutions between peaks. The order of elution of individual fatty acids in the GLC 463 methyl ester reference standard is set forth in Table 5 above.

Using the known weight percent of the individual fatty acid esters in the GLC 463 methyl ester reference standard, a calibration curve is generated based upon an internal standardization (normalization). This internal standardization may be accomplished by the data system in accordance with the instruction manual accompanying the data system. When calibrating the gas chromatograph, the GLC 463 methyl ester reference standard is known to contain 8 weight percent oleic acid (C18:1) and 6 weight percent linoleic acid (C 18:2), based upon the total weight of the GLC 463 methyl ester reference standard. After completing the internal standardization, the normalized percentages of the individual fatty acids are determined using the data system.

The detection limit using this procedure for each individual fatty acid is 0.1 weight percent. For purposes of significant figures, all percentages are rounded to the nearest tenth. Duplicate samples should have results for major components with relative percent deviations from the original sample of ±10 weight percent. The weight percent determined for each individual fatty acid should be approximately equal to the percent of the area associated with each peak on the chromatogram. However, fatty acids with lower molecular weights may deviate from this rule to some extent.

The present invention is more particularly described in the following examples that are intended as illustrations only, since numerous modifications and variations with in the scope of the present invention will be apparent to those skilled in the art.

EXAMPLES

Comparative Examples 1–2 and Examples 1–2

These comparative examples and examples demonstrate the varying effects of orally feeding lactating cows different rations. In Comparative Example 1 the cows were fed a control ration, in Comparative Example 2 the cows were fed a mixture of roasted normal soybeans and the control ration, in Example 1 the cows were fed a mixture of roasted high oleic soybeans and the control ration, and in Example 2 the cows were fed a mixture of high oleic corn and the control ration. The normal soybeans and the high oleic soybeans were each roasted at a temperature of about 600° F. to about 630° F. and then cracked into four to sixteen pieces per soybean, in accordance with the procedure that is detailed on pages 12–13 above. The high oleic soybeans used in Example 1 were the A233HO soybeans that are commercially available from Asgrow Seed Company of West Des Moines, Iowa. The high oleic corn used in Example 2 was cracked into about four to sixteen pieces per kernel. The high oleic corn of Example 2 was corn grown from seed that was based on crossing the line of female seeds identified as B730L with the line of male seeds identified as AEC2720L corn, as previously discussed on pages 9–10 above.

In these examples and comparative examples, 48 multiparous and primiparous Holstein cows were randomly assigned to one of four treatments: ten cows each were placed in the treatment of Example 1, the treatment of Example 2, the treatment of Comparative Example 1, and the treatment of Comparative Example 2. The cows ranged from 120 to 250 days in milk. The cows were randomly allotted to the four different treatments of Examples 1–2 and Comparative Examples 1–2 based upon milk production, parity, and days in milk.

The components of the control ration of Comparative Example 1, and the rations of Comparative Example 2, Example 1, and Example 2 that included roasted normal soybeans, roasted high oleic soybeans, and high oleic corn, respectively, in addition to the control ration, are shown in Table 6 below:

TABLE 6

| | WEIGHT PERCENT (DRY BASIS)* | | | |
| --- | --- | --- | --- | --- |
| INGREDIENT | Comparative Example 1 (Control) | Comparative Example 2 (Roasted Regular Soybeans) | Example 1 (Roasted High Oleic Soybeans) | Example 2 (High Oleic Corn) |
| alfalfa haylage | 30.7 | 29 | 29 | 47.5 |
| alfalfa hay | 8 | 7 | 7 | 10.3 |
| corn silage | 20.4 | 20 | 20 | 0 |
| corn, cracked | 26.4 | 24.9 | 24.9 | 0 |
| roasted regular soybeans | 0 | 16.9 | 0 | 0 |
| roasted high oleic soybeans | 0 | 0 | 16.9 | 0 |
| high oleic corn | 0 | 0 | 0 | 33.7 |
| SurePro ® bypass protein | 6.4 | 0 | 0 | 6.9 |
| soybean meal | 6.2 | 0 | 0 | 0 |
| dicalcium phosphate | 0.17 | 0 | 0 | 0.23 |
| Dairy Supreme Premix* | 0.96 | 0.97 | 0.97 | 0.95 |
| salt | 0.4 | 0.4 | 0.4 | 0.4 |
| magnesium oxide | 0.16 | 0.19 | 0.19 | 0.16 |
| limestone | 0.49 | 0.58 | 0.58 | 0 |

*based upon the total weight of the feed composition

The nutrient breakdown for the various rations listed in Table 6 are provided in Table 7 below:

TABLE 7

| | WEIGHT PERCENT (DRY BASIS)* | | | |
| --- | --- | --- | --- | --- |
| NUTRIENT | Comparative Example 1 (Control) | Comparative Example 2 (Roasted Regular Soybeans) | Example 1 (Roasted High Oleic Soybeans) | Example 2 (High Oleic Corn) |
| crude protein | 18.2 | 18.2 | 18.2 | 18.2 |
| $NE_L$ (Mcal/pound) | 0.72 | 0.74 | 0.74 | 0.74 |
| acid detergent soluble fiber (ADF) | 19 | 19 | 19 | 19 |
| neutral detergent soluble fiber (NDF) | 28.8 | 29.3 | 29.3 | 27 |
| fat | 3.3 | 6.2 | 6.2 | 4.9 |
| calcium | 1.06 | 1.03 | 1.03 | 1.1 |
| phosphorus | 0.47 | 0.45 | 0.45 | 0.47 |

*based upon the total weight of the feed composition

The cows were fed the ration of each treatment for a total period of 25 days. The cows were fed once daily in the morning and then the feed was lightly mixed in front of the cows six times per day to encourage additional feed ingestion by the cattle. Additionally, seven cows of the twelve cows in each of the treatments of Examples 1–2 and Comparative Examples 1–2 were injected with recombinant bovine somatotropin (bST) during the 25 day experimental test period.

Leftover rations from the previous day's feedings were collected from each feeding trough and weighed prior to feeding the test cattle the next day. The cows received a sufficient amount of rations each day to ensure that at least about 10 weight percent, based upon the total amount of rations provided at the beginning of each day, remained per day for each test cow. Feed refusals were measured daily, and water was supplied ad libitum. Each test cow received routine care and management consistent with appropriate recommendations in the *Guide for the Care and Use of*

*Agricultural Animals in Agricultural Research and Teaching* (1st edition, March 1988).

Each cow was milked three times daily and the weight of produced milk was recorded at each milking. Duplicate milk samples were taken from each cow on days 0, 7, 14, and 21 of the testing period. Each sample included ⅓ of the sample volume from each milking on the particular sample day. One duplicate of the four samples taken on days 0, 7, 14, and 21 was maintained as a separate sample for each of days 0, 7, 14, and 21, and the day 0, 7, 14, and 21 portions of this duplicate sample were each individually analyzed for crude protein, fat, lactose, and total solids in accordance with the property determination and characterization techniques presented above.

Additionally, the day 0 and day 21 portions of the first duplicate milk sample were frozen and later analyzed for fatty acid composition of milk produced on sample days 0 and 21 by Land O'Lakes, Inc. in accordance with the fatty acid analysis technique presented in the property determination and characterization techniques above. Likewise, the day 0 and day 21 portions of the second duplicate milk sample were frozen and the fatty acid composition for sample days 0 and 21 was analyzed by Optimum Quality Grains, LLC in accordance with the fatty acid analysis details provided above in the property determination and characterization techniques section.

Additionally, the total volume of milk produced on days 21–25 of the testing for each of the treatments of Comparative Examples 1 and 2 and for Examples 1–2 was collected and used to produce butter at a pilot plant of Land O'Lakes. The butter was produced using a batch mixer obtained from Hobart Corporation of Troy, Ohio. The milk used to produce the butter was cooled to a temperature of about 60° C. during production of the butter. The butter that was produced was sampled and the butter samples were analyzed for solid fat index, fatty acid composition, penetration, and visual characteristics, in accordance with the property determination and characterization techniques presented above.

The milk production and milk component data were analyzed using the general linear model (GLM) statistical procedure of SAS® statistical analysis software for a randomized, complete block design that included both the particular feed regimen and the week of the test period in the model statement. The SAS® statistical analysis software is available from SAS Institute, Inc. of Cary, N.C. Additionally, all data were analyzed to determine the mean of the data for each variable under consideration over the entire experimental period.

Statistical analysis was completed for the dry matter intake, milk production amount, and milk composition parameters. The dry matter intake and the milk production rate data were covariately adjusted using pre-trial milk weights. Covariate adjustment entails the creation of a statistical adjustment factor, considering the rate of milk production of each individual cow prior to any experimental feeding, that yields a standard base line for dry matter intake and milk production rate for the test cattle, and thereby statistically accounts for any variations in dry matter intake and milk production rate between different cattle prior to feeding in accordance with this example.

Additionally, the PDiff function of the GLM statistical procedure was used to characterize the mean value by providing a Probability value (P) for comparing between the mean values of the group fed the control ration and the mean values of the group fed the test ration, for particular test parameters or variables. The probability value, P, is a measure of the statistical probability that the differing parameter values between the cattle fed the control ration and the cattle fed the test ration may be explained by the difference between feeding regimen.

A P value of 0.10 means that 10 times out of 100 the results can be explained by factors other than differences in the feeding regimen. Likewise, a P value of 0.77 means that 77 times out of 100, the difference in value between the control group and the test group may be explained by factors other than differences in the feeding regimen. For purposes of comparing data in this document, P values of 0.10, or lower, are considered to be statistically significant. Thus, where a P value of 0.10 or less is returned for particular results, it is assumed that the differing results are fully explained by differences in the feeding regimen.

The mean of various production parameters for the cattle fed the control ration in accordance with Comparative Example 1 and for the cattle fed the test rations of Comparative Example 2 and of Examples 1 and 2 over the first 21 days of the 25 day test period are provided in Table 8 below:

TABLE 8

Production Value Means Over First 21 Days of 25 Day Test Period

| MILK PRODUCTION PARAMETER | Comparative Example 1 (Control) | Comparative Example 2 (Roasted Regular Soybeans) | Example 1 (Roasted High Oleic) Soybeans) | Example 2 (High Oleic Corn) |
|---|---|---|---|---|
| Dry Matter Intake (pounds/day/cow) | 50.3$^a$ | 46.6$^b$ | 50.5$^a$ | 49.7$^a$ |
| Milk Production (pounds/day/cow) | 84.4$^a$ | 85.5$^a$ | 85.8$^a$ | 80.9$^b$ |
| Milk Fat (weight percent)** | 3.20$^a$ | 3.02$^a$ | 3.51$^b$ | 3.44$^b$ |
| Milk Fat (pounds/day/cow) | 2.76$^a$ | 2.67$^a$ | 2.98$^a$ | 2.80$^a$ |
| Fat Corrected Milk Production (pounds/day/cow) | 80.3$^a$ | 79.0$^a$ | 85.7$^b$ | 80.2$^a$ |
| Crude Protein (weight percent)** | 3.02$^a$ | 2.91$^b$ | 3.06$^a$ | 3.06$^a$ |
| Crude Protein (pounds/day/cow) | 2.61$^a$ | 2.58$^a$ | 2.59$^a$ | 2.45$^b$ |
| Lactose (weight percent)** | 4.77$^a$ | 4.92$^c$ | 4.91$^{bc}$ | 4.84$^{ab}$ |
| Lactose (pounds/day/cow) | 4.13$^b$ | 4.37$^a$ | 4.18$^b$ | 3.92c |
| Total Solids (weight percent)** | 11.69$^a$ | 11.55$^a$ | 12.20$^b$ | 12.02$^b$ |
| Total Solids (pounds/day/cow) | 10.12$^{ab}$ | 10.25$^a$ | 10.37$^a$ | 9.76$^b$ |
| Solids Corrected Milk Production (pounds/day/cow) | 75.0$^a$ | 73.6$^a$ | 79.3$^b$ | 74.3$^a$ |

*Covariately adjusted for pre-trial milk production weights
**Based upon the total weight of the produced milk
$^a, ^b, ^c, ^{ab}, ^{bc}$Numbers within the same row with different superscripts differ at a probability value of $P \leq 0.10$ Additionally, the dry matter intake, the milk production rate, the milk fat concentration in the produced milk, and the milk protein concentration in the produced milk over the first 21 days of the 25 day test period for the cattle fed the control ration of Comparative Example 1 and for the cattle fed the test rations of Comparative Example 2 and Examples 1–2 are graphically presented in FIGS. 1, 2, 3, and 4, respectively. The data points included in FIGS. 1, 2, 3, and 4 are mean values for the cattle fed rations in accordance with Comparative Example 1, Comparative Example 2, Example 1 and Example 2, respectively, as of days 0, 7, 14, and 21 of the test period.

The details provided in Table 8 and FIG. 1 illustrate that the cows consuming a ration containing roasted regular soybeans consumed about 3 to about 4 pounds less dry matter than the cows that received the other three treatments ($P<0.10$) of Comparative Example 2 and Example 1 and 2. Overall, during the 21 day sampling period, cows fed roasted high oleic soybeans had about the same amount of dry matter intake as cows fed the control ration only.

Figure 2:
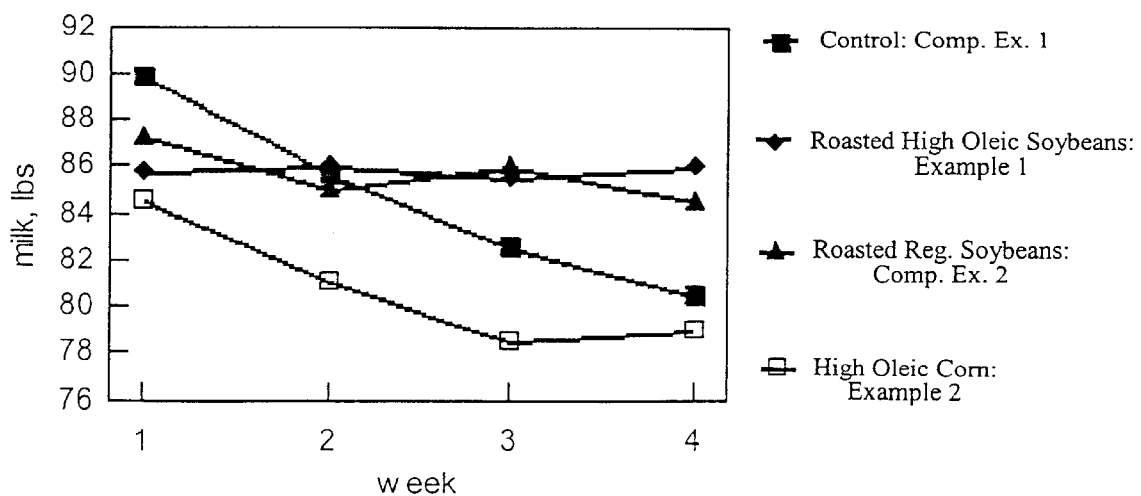
FIG. 2 is a graph depicting differences in the amount of milk production by lactating cows fed a control ration, or the control ration along with regular soybeans, versus lactating cows fed the control ration along with either high oleic soybeans or high oleic corn, in accordance with the present invention.
Figure 3:
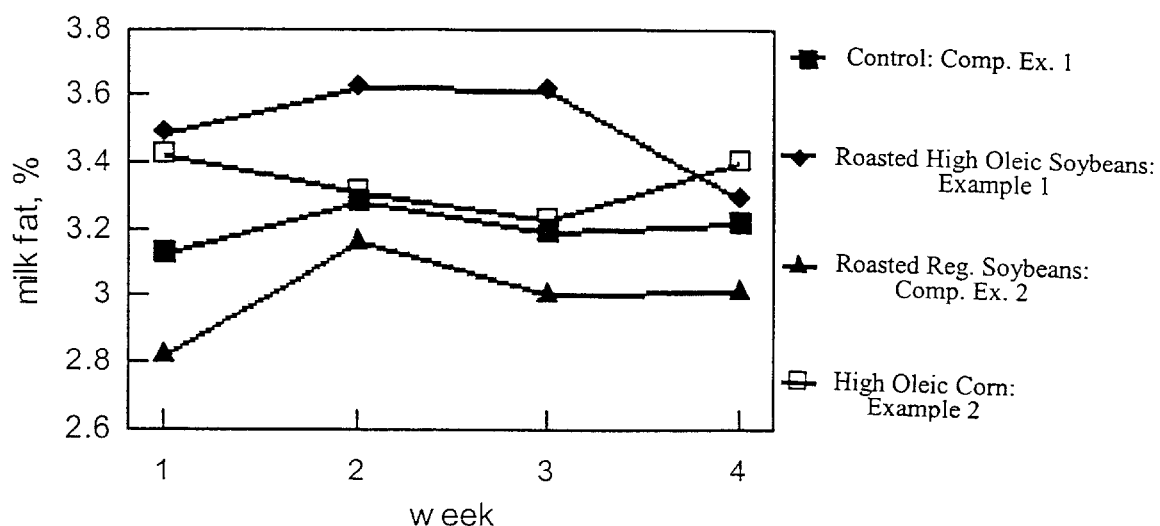
FIG. 3 is a graph depicting differences in the concentration of milk fat in milk produced by lactating cows fed a control ration, or a control ration along with regular soybeans, versus lactating cows fed the control ration along with either high oleic soybeans or high oleic corn, in accordance with the present invention.
Figure 4:
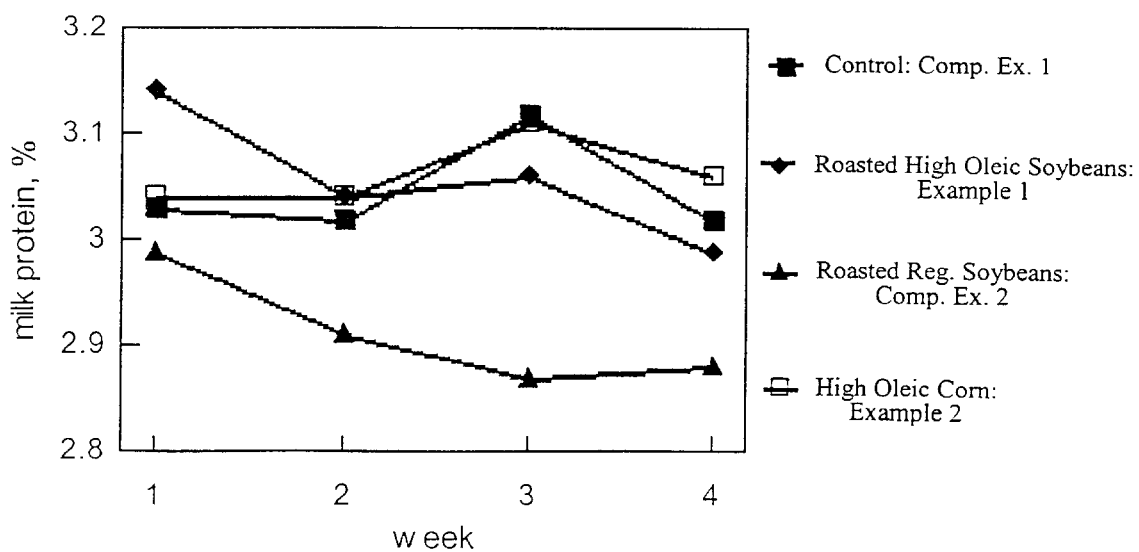
FIG. 4 is a graph depicting differences in the concentration of protein in milk produced by lactating cows fed a control ration, or the control ration along with regular soybeans, versus lactating cows fed the control ration along with either high oleic soybeans or high oleic corn, in accordance with the present invention.

Milk production did not follow the same trend as dry matter intake. For example, milk production by cows fed high oleic corn decreased rapidly at the onset of the test period and was lower than the other three treatments (Table 8 and FIG. 2, $P<0.01$). Overall, milk production generally decreased for cows fed the control ration, cows fed the control ration plus the high oleic corn, and cows fed the control ration plus roasted regular soybeans (FIG. 2). On the other hand, milk production by cows fed the combination of roasted high oleic soybeans and the control ration remained relatively steady, as compared to the other three test treatments, during the first 21 days of the test period.

Cows fed the roasted high oleic soybeans and cows fed the high oleic corn saw a net increase in the concentration of fat in the produced milk, as compared to both cows fed only the control ration and cows fed the roasted regular soybeans (Table 8, $P<0.10$). Similarly, the concentration of lactose and the concentration of total solids in the produced milk increased for both cows fed roasted high oleic soybeans and cows fed the high oleic corn, as compared to cows fed only the control ration or the roasted regular soybeans, (Table 8, $P<0.10$). However, the reduced milk production by the cows fed high oleic corn caused the production of fat corrected milk and the production of solids corrected milk to remain relatively steady, as compared to the production of fat corrected milk and solid corrected milk by cows fed the control ration or the control ration plus regular roasted soybeans (Table 8, $P<0.10$). Furthermore, the enhanced milk production of cows fed roasted high oleic soybeans, in combination with the increased combination of fat, lactose, and total solids in the milk produced by cows fed roasted high oleic soybeans, caused the fat corrected milk production and the solids corrected milk production to increase for cows fed the roasted high oleic soybeans, as compared to the fat corrected milk production and the solids corrected milk production by cows fed the other treatments (Table 8, $P<0.10$).

The fatty acid content, broken down by particular fatty acids, for milk produced on day 21 of the testing period, for cows fed the four different treatment rations, is reproduced in Table 9 below:

TABLE 9

Mean Values of Individual Fatty Acid Concentrations
For Milk Produced on Day 21 of the 25 Day Test Period

WEIGHT PERCENT (DRY BASIS)*

| FATTY ACID | Comparative Example 1 (Control) | Comparative Example 2 (Roasted Regular Soybeans) | Example 1 (Roasted High Oleic Soybeans) | Example 2 (High Oleic Corn) | Probability Value (P) |
|---|---|---|---|---|---|
| Butyric Acid (C4:0) | 8.22$^a$ | 6.78$^{ab}$ | 7.49$^{ab}$ | 6.08$^b$ | — |
| Caproic Acid (C6:0) | 2.02$^a$ | 2.08$^a$ | 1.85$^b$ | 2.06$^a$ | 0.03 |
| Caprylic Acid (C8:0) | 1.38$^a$ | 1.39$^a$ | 1.20$^b$ | 1.41$^a$ | 0.04 |
| Capric Acid (C10:0) | 3.10$^a$ | 2.99$^{ab}$ | 2.55$^b$ | 3.11$^a$ | 0.02 |
| Lauric Acid (C12:0) | 3.65$^a$ | 3.24$^{ab}$ | 2.84$^b$ | 3.47$^a$ | 0.001 |
| Myristic Acid (C14:0) | 11.61$^a$ | 10.46$^b$ | 10.27$^b$ | 11.33$^a$ | 0.05 |
| Myristoleic Acid (C14:1) | 1.11$^a$ | 0.80$^b$ | 0.76$^b$ | 0.90$^b$ | 0.02 |
| Palmitic Acid (C16:0) | 32.17$^a$ | 26.47$^b$ | 23.77$^c$ | 28.89$^b$ | 0.03 |
| Palmitoleic Acid (C16:1) | 2.05$^a$ | 1.51$^{bc}$ | 1.38$^c$ | 1.78$^{ab}$ | 0.01 |
| Stearic Acid (C18:0) | 8.25$^a$ | 11.56$^c$ | 12.21$^c$ | 10.77$^b$ | 0.03 |
| Trans-isomer of Oleic Acid (C18:1) | 0.16$^a$ | 0.26$^{bc}$ | 0.38$^c$ | 0.23$^{ab}$ | 0.03 |
| Cis-isomer of Oleic Acid (C18:1) | 16.92$^a$ | 20.07$^b$ | 26.53$^c$ | 19.89$^b$ | 0.03 |
| Oleic Acid (C18:1) | 17.08$^a$ | 20.33$^{bc}$ | 26.91$^c$ | 20.12$^{ab}$ | 0.03 |
| Linoleic Acid (C18:2) | 2.22$^{bc}$ | 4.61$^a$ | 1.78$^c$ | 2.71$^b$ | 0.007 |
| Linolenic Acid (C18:3) | 0.58$^c$ | 1.01$^a$ | 0.73$^b$ | 0.69$^{bc}$ | 0.03 |
| Arachidic Acid (C20:0) | 0.13$^a$ | 0.15$^a$ | 0.14$^a$ | 0.33$^b$ | 0.04 |
| Other | 6.42$^{ab}$ | 6.63$^a$ | 6.12$^b$ | 6.35$^{ab}$ | 0.03 |

*Based upon the total weight of all fatty acids in the produced milk
$^a$, $^b$, $^c$, $^{ab}$, $^{bc}$Numbers within the same row with different superscripts differ at the indicated probability value (P) of that row Also, data for individual fatty acids in milk produced on day 0 and milk produced on day 21 of the testing period by cows fed the four different treatment rations is presented in Table 10 below:

TABLE 10

Mean Values of Individual Fatty Acid Concentrations
For Milk Produced on Day 0 and on Day 21 of the 25 Day Test Period

WEIGHT PERCENT (DRY BASIS)*

| FATTY ACID | WEEK | Comparative Example 1 (Control) | Comparative Example 2 (Roasted Regular Soybeans) | Example 1 (Roasted High Oleic Soybeans) | Example 2 (High Oleic Corn) |
|---|---|---|---|---|---|
| Butyric Acid (C4:0) | 0 | 6.62 | 5.53 | 7.81 | 6.47 |
|  | 4 | 8.22 | 6.78 | 7.49 | 6.08 |
| Caproic Acid (C6:0) | 0 | 1.92 | 1.98 | 1.73 | 1.88 |
|  | 4 | 2.02 | 2.08 | 1.85 | 2.06 |
| Caprylic Acid (C8:0) | 0 | 1.22 | 1.28 | 1.08 | 1.22$^a$ |
|  | 4 | 1.38 | 1.39 | 1.2 | 1.41$^b$ |
| Capric Acid (C10:0) | 0 | 2.53$^a$ | 2.71 | 2.33 | 2.57$^a$ |
|  | 4 | 3.10$^b$ | 2.99 | 2.55 | 3.11$^b$ |
| Lauric Acid (C12:0) | 0 | 2.82$^a$ | 2.98 | 2.61 | 2.85$^a$ |
|  | 4 | 3.65$^b$ | 3.24 | 2.84 | 3.47$^b$ |
| Myristic Acid (C14:0) | 0 | 10.20$^a$ | 10.49 | 9.83 | 10.34$^a$ |
|  | 4 | 11.61$^b$ | 10.46 | 10.27 | 11.33$^b$ |
| Myristoleic Acid (C14:1) | 0 | 0.88$^a$ | 0.9 | 0.91 | 0.85 |
|  | 4 | 1.11$^b$ | 0.8 | 0.76 | 0.9 |
| Palmitic Acid (C16:0) | 0 | 30.95 | 30.63$^a$ | 29.12$^a$ | 30.27 |
|  | 4 | 32.17 | 26.47$^b$ | 23.77$^b$ | 28.89 |
| Palmitoleic Acid (C16:1) | 0 | 1.83 | 1.79 | 1.68 | 1.85 |
|  | 4 | 2.05 | 1.51 | 1.38 | 1.78 |

TABLE 10-continued

Mean Values of Individual Fatty Acid Concentrations
For Milk Produced on Day 0 and on Day 21 of the 25 Day Test Period

WEIGHT PERCENT (DRY BASIS)*

| FATTY ACID | WEEK | Comparative Example 1 (Control) | Comparative Example 2 (Roasted Regular Soybeans) | Example 1 (Roasted High Oleic Soybeans) | Example 2 (High Oleic Corn) |
|---|---|---|---|---|---|
| Stearic Acid (C18:0) | 0 | 10.57$^a$ | 10.57 | 10.80$^a$ | 10.68 |
|  | 4 | 8.25$^b$ | 11.56 | 12.21$^b$ | 10.77 |
| Trans-isomer of Oleic | 0 | 0.35$^a$ | 0.39$^a$ | 0.38 | 0.41$^a$ |
| Acid (C18:1) | 4 | 0.16$^b$ | 0.26$^b$ | 0.38 | 0.23$^b$ |
| Cis-isomer of Oleic Acid | 0 | 20.30$^a$ | 21.01 | 21.90$^a$ | 20.7 |
| (C18:1) | 4 | 16.92$^b$ | 20.07 | 26.53$^b$ | 19.89 |
| Oleic Acid (C18:1) | 0 | 20.65$^a$ | 21.4 | 22.28 | 21.11 |
|  | 4 | 17.08$^b$ | 20.33 | 26.91 | 20.12 |
| Linoleic Acid (C18:2) | 0 | 2.59 | 2.66$^a$ | 2.60$^a$ | 2.57 |
|  | 4 | 2.23 | 4.61$^b$ | 1.78$^b$ | 2.71 |
| Linolenic Acid (C18:3) | 0 | 0.54 | 0.55$^a$ | 0.58$^a$ | 0.55$^a$ |
|  | 4 | 0.58 | 6.78$^{ab}$ | 0.73$^b$ | 0.69$^b$ |
| Arachidic Acid (C20:0) | 0 | 0.15 | 0.55$^a$ | 0.16 | 0.16$^a$ |
|  | 4 | 0.13 | 1.01$^b$ | 0.15 | 0.33$^b$ |
| Other | 0 | 6.53 | 6.38$^b$ | 6.38 | 6.65 |
|  | 4 | 6.42 | 6.63$^b$ | 6.63 | 6.35 |

*Based upon the total weight of all fatty acid in the produced milk
$^a$, $^b$, $^{ab}$Numbers with different superscripts for weeks 0 and 4 differ at a probability value of $P \leq 0.05$ for individual fatty acids in a particular Example or Comparative Example The data in Table 9 demonstrates that cows fed roasted high oleic soybeans had lower concentrations of C6:0 (P<0.03), C8:0 (P<0.04), C10:0 (P<0.02), C12:0 (P<0.001), C14:0 (P<0.05), C16:0 (P<0.03), C16:1 (P<0.01), and C18:3 (P<0.03) fatty acids, and higher concentrations of C18:0 (P<0.03), C18:1 trans-isomer (P<0.03), and C18:1 cis-isomer (P<0.03) fatty acids than did milk fat of cows that were fed either the control ration, the ration including roasted regular soybeans, or the ration including high oleic corn. (Table 9).

The increase in the concentration of the cis-isomer of oleic acid (C 18:1 cis-isomer) in milk produced by cows fed feed containing roasted high oleic soybeans, as compared to cows fed only the control ration, is particularly noteworthy at +56.8% [26.53 wt % versus 16.92 wt % (Table 9)]. Also, the decrease in the concentration of the palmitic acid (C16:0) in milk produced by cows fed feed containing roasted high oleic soybeans, as compared to cows fed only the control ration, is particularly noteworthy at −26.1% [23.77 wt % versus 32.17 wt % (Table 9)]. This very substantial decrease in the concentration of palmitic acid is important because palmitic acid is considered to be one of the worst fatty acids from the standpoint of human health.

Cows fed roasted regular soybeans did exhibit increases in the concentration of C18:0 (P<0.03), C18:1 trans-isomer (P<0.03), and C18:1 cis-isomer (P<0.03) fatty acids in produced milk, but not to the extent seen in cows fed roasted high oleic soybeans. (Table 9). Cows fed high oleic corn did have higher amounts of C18:0 (P<0.03), Cl 8:1 cis-isomer (P<0.03), and C20:0 (P<0.04) fatty acids than cows fed only the control ration. However, these increases relative to cows fed roasted regular soybeans were relatively small and probably would have minimal effects on the functional characteristics of butter.

Between day 0 and day 21 of the test period, the cows fed the control ration of Comparative Example 1 did show some significant changes in fatty acid composition (P<0.05). The exact cause of this change is not known. However, it is believed that the most probable cause for this change is the difference between the ration the cows were fed prior to day 0 of the test period, versus the control ration. The cows were originally fed, prior to day 0 of the trial period, a feed that contained some animal-vegetable blend fat and whole cottonseed, whereas the control ration contained a lower percentage of fat. Since the cows fed roasted high oleic soybeans were also given the control ration, the changes apparently caused by the start of feeding the control ration to the cows in Comparative Example 1 may mean that the cows additionally fed the roasted high oleic soybeans actually would have seen an even greater increase in the concentration of the cis-isomer of C18:1 fatty acid in produced milk, as compared to the concentration of the cis-isomer of C18:1 fatty acid in milk produced by cows fed the control ration, if the control ration had been the feed used prior to start of the test period for the cows of Comparative Example 1.

Fatty acid analyses of butter samples produced from milk collected during Examples 1 and 2 and Comparative Examples 1 and 2 are presented in Table 11 below:

TABLE 11

Mean Values of Individual Fatty Acid Concentrations For Butter
Made From Milk Produced on Days 22–25 of the 25 Day Test Period

WEIGHT PERCENT (DRY BASIS)*

| FATTY ACID | LAB** | Comparative Example 1 (Control) | Comparative Example 2 (Roasted Regular Soybeans) | Example 1 (Roasted High Oleic Soybeans) | Example 2 (High Oleic Corn) |
|---|---|---|---|---|---|
| Butyric Acid (C4:0) | 1 | 2.4 | 2.6 | 2.3 | 2.5 |
|  | 2 | 4.6 | 3.5 | 4.9 | 3.9 |
| Caproic Acid (C6:0) | 1 | 1.9 | 2 | 1.7 | 1.8 |
|  | 2 | 2.2 | 2.22 | 2 | 2.2 |
| Caprylic Acid (C8:0) | 1 | 1.3 | 1.3 | 1.1 | 1.3 |
|  | 2 | 1.6 | 1.5 | 1.3 | 1.5 |
| Capric Acid (C10:0) | 1 | 3.2 | 3 | 2.5 | 3 |
|  | 2 | 3.5 | 3.2 | 2.7 | 3.3 |
| Lauric Acid (C12:0) | 1 | 3.9 | 3.2 | 2.8 | 3.4 |
|  | 2 | 4 | 3.4 | 3 | 3.8 |
| Myristic Acid (C14:0) | 1 | 12.5 | 10.4 | 10.6 | 11.9 |
|  | 2 | 12.4 | 10.6 | 10.4 | 12 |
| Myristoleic Acid (C14:1) | 1 | 1.2 | 0.8 | 0.8 | 1 |
|  | 2 | 1.2 | 0.8 | 0.9 | 1.1 |
| Pentadecanoic Acid (C15:0) | 1 | 1.3 | 1 | 0.9 | 1.1 |
| Palmitic Acid (C16:0) | 1 | 33.7 | 25.5 | 24.1 | 31.1 |
|  | 2 | 32.5 | 25.8 | 23.5 | 31.2 |
| Palmitoleic Acid (C16:1) | 1 | 1.7 | 1.2 | 1.1 | 1.5 |
|  | 2 | 2.1 | 1.5 | 1.4 | 2 |
| Heptadecanoic Acid (C17:0) | 1 | 0.6 | 0.5 | 0.6 | 0.6 |
| Acid (C17:1) | 1 | 0.4 | 0.3 | 0.2 | 0.2 |
| Stearic Acid (C18:0) | 1 | 9.1 | 13.1 | 13.1 | 10.7 |
|  | 2 | 8.7 | 12.7 | 12.3 | 9.7 |
| Trans-isomer of Oleic Acid (C18:1) | 2 | 0.2 | 0.3 | 0.4 | 0.2 |
| Cis-isomer of Oleic Acid (C18:1) | 2 | 17.9 | 21.7 | 28.1 | 20.1 |
| Oleic Acid (C18:1) | 1 | 22 | 27 | 34 | 25.5 |
|  | 2*** | 18.1 | 22 | 28.5 | 20.3 |
| Linoleic Acid (C18:2) | 1 | 3.8 | 6.4 | 3.2 | 3.3 |
|  | 2 | 2.6 | 5.7 | 2 | 2.3 |
| Linolenic Acid (C18:3) | 1 | 0.7 | 1.2 | 0.8 | 0.7 |
|  | 2 | 0.7 | 1.1 | 0.8 | 0.7 |

TABLE 11-continued

Mean Values of Individual Fatty Acid Concentrations For Butter
Made From Milk Produced on Days 22–25 of the 25 Day Test Period

WEIGHT PERCENT (DRY BASIS)*

| FATTY ACID | LAB** | Comparative Example 1 (Control) | Comparative Example 2 (Roasted Regular Soybeans) | Example 1 (Roasted High Oleic Soybeans) | Example 2 (High Oleic Corn) |
|---|---|---|---|---|---|
| Arachidic Acid (C20:0) | 1 | 0.1 | 0.2 | 0.1 | 0.1 |
|  | 2 | 0.1 | 0.2 | 0.2 | 0.2 |
| Lesquerolic Acid (C20:1) | 1 | 0.1 | 0.1 | 0.2 | 0.1 |
| Behenic Acid (C22:0) | 1 | 0 | 0.1 | 0 | 0.1 |
| Lignoceric Acid (C24:0) | 1 | 0 | 0 | 0 | 0 |
| Other | 2 | 6 | 6.17 | 6.38 | 5.93 |

*Based upon the total weight of all fatty acids contained in the butter
**Lab 1 is the Land O'Lakes Analytical Lab (results based on one sample of butter) Lab 2 is the Optimum Quality Grains Lab (results based on three samples of butter)
***Determined by adding the values obtained for the cis-isomers and trans-isomers of Oleic Acid (C18:1)

The fatty acid analyses on the butter samples were replicated by the Optimum Quality Grains laboratory and the Land O'Lakes laboratory. The analyzed concentrations of most fatty acids were very similar for both the Optimum Quality Grains laboratory and the Land O'Lakes laboratory, with the exception of oleic acid (C18:1) which was consistently higher for the analyses conducted by the Land O'Lakes laboratory. Nonetheless, these results are significant, since (1) the cis-isomer of the C18:1 fatty acid makes up the bulk of the oleic acid (C18:1) in the butter, (2) the Land O'Lakes analyses for total C18:1 shows an increase of about 54.5% in the concentration of C18:1 fatty acid for cows fed roasted high oleic soybeans versus cows fed only the control ration, and (3) the Optimum Quality Grains analysis shows a similar 57% increase in the cis-isomer of oleic acid (C18:1) for cows fed roasted high oleic soybeans versus cows fed only the control ration. These results, though differing numerically between the Land O'Lakes analysis and the Optimum Quality Grains analysis, are believed to demonstrate that the concentration of the cis-isomer form of oleic acid increases by greater than 50% in cows fed roasted high oleic soybeans versus the concentration of the cis-isomer form of oleic acid in milk produced by cows fed only the control ration.

Likewise, the trend of significant reductions of the concentration of palmitic acid in milk for the roasted high oleic soybean scenario of Example 1 continued for butter that was made from this milk. Specifically, the decrease in the concentration of palmitic acid (C16:0) in butter produced by cows fed feed containing roasted high oleic soybeans, as compared to cows fed only the control ration, was a surprising −27.6% [23.5 wt % versus 32.5 wt % (Table 11)] based on the Optimum Quality Grains analysis and was similarly −28.5% [24.1 wt % versus 33.7 wt % (Table 11)] based on the Land O'Lakes analysis. Again, this very substantial decrease in the concentration of palmitic acid is important because palmitic acid is considered to be one of the worst fatty acids from the standpoint of human health.

The butter that was based upon the different treatment rations of Comparative Examples 1 and 2 and Examples 1 and 2 was also analyzed for total fat concentration, total water concentration, salt concentration, solid fat index, and penetration. The data for Comparative Examples 1 and 2 and for Examples 1 and 2 are presented in Table 12 below:

TABLE 12

Characteristics of Butter Made From Milk Produced
on Days 22–25 of the 25 Day Test Period

| BUTTER CHARACTERISTIC | Temperature | Comparative Example 1 (Control) | Comparative Example 2 (Roasted Regular Soybeans) | Example 1 (Roasted High Oleic Soybeans) | Example 2 High Oleic Corn) |
|---|---|---|---|---|---|
| Fat Content of Butter (weight %)* | N/A | 84.1 | 82.3 | 82.2 | 83 |
| Water Content of Butter (weight %)* | N/A | 14.4 | 15.9 | 16.2 | 15.3 |
| Salt Content of Butter (weight %)* | N/A | 0.07 | 0.08 | 0.07 | 0.08 |
| Solid Fat Index (weight % solid fat remaining) | 50° F. | 33.3 | 26 | 22.1 | 32.2 |
|  | 70° F. | 13 | 9.6 | 7.8 | 12.1 |
|  | 80° F. | 9.9 | 7.3 | 6 | 9.3 |
|  | 92° F. | 2.4 | 2.1 | 1.1 | 2.5 |
|  | 104° F. | 0 | 0.7 | 0.4 | 0.2 |
| Penetration Scores (mm) | 38° F. | 37 | 52 | 66 | 37 |
|  | 48° F. | 55 | 74 | 80 | 54 |
|  | 52° F. | 63 | 92 | 101 | 67 |
|  | 63° F. | 114 | 220 | 245 | 118 |

*Based upon the total weight of the butter

Statistical analysis was not run on this data because there was only one sample per treatment ration. Nonetheless, there were no real differences in the total fat content, the total water content, or the salt content of the butters produced based upon the milk provided by the cows fed the different treatment rations. The solid fat index data indicates that butter based upon milk provided by the cows fed the roasted high oleic soybeans is softer than butter produced from milk provided by cows administered the other treatment rations. Butter derived from milk produced by cows fed roasted regular soybeans was softer than butter derived from milk produced by cows fed the control treatment ration, but was not as soft as the butter derived from milk produced by cows that were fed the roasted high oleic soybeans. Butter derived from milk produced by cows fed high oleic corn had solid fat indices that were very similar to the solid fat indices of butter derived from milk produced by cows fed only the control ration. Penetration scores followed the same trend as the solid fat indices. In particular, the butter derived from milk produced by cows fed roasted high oleic soybeans showed a greater amount of penetration than butter derived from milk produced by cows fed the roasted regular soybeans, the high oleic corn, or only the control ration.

Comparative Examples 3–4 and Examples 3–4

These comparative examples and examples demonstrate varying effects of orally feeding lactating cows a control ration (Comparative Example 3), a mixture of the control ration and roasted regular soybeans (Comparative Example 4), a mixture of the control ration and roasted high oleic soybeans (Example 3), and a mixture of a control ration and non-enzymatically browned high oleic soybeans (Example 4). The normal soybeans and the high oleic soybeans used in Comparative Example 4 and in Example 3, respectively, were each roasted at a temperature of about 600° F. to about 630° F. and then cracked into four to sixteen pieces per soybean, in accordance with the procedure that is detailed on pages 12–13 above. The high oleic soybeans used in Example 4 were cracked and non-enzymatically browned in accordance with the procedure that is detailed on pages 13–18 above. The high oleic soybeans used in Examples 3 and 4 were the A233HO soybeans that are commercially available from Asgrow Seed Company of West Des Moines, Iowa.

Twelve multiparous Holstein cows averaging about 60 to about 65 days in milk each were arranged in a 4×4 Latin square design. Each cow was randomly allotted to the control ration treatment of Comparative Example 3, the roasted regular soybean treatment of Comparative Example 4, the roasted high oleic soybean treatment of Example 3, or the non-enzymatically browned high oleic soybean treatment of Example 4.

In the 4×4 Latin square design, each cow is cycled through each treatment, namely, the control ration treatment, the roasted regular soybean treatment, the roasted high oleic soybean treatment, and the non-enzymatically browned high oleic soybean treatment. This permits each cow to act as a control for standardizing the testing differences observed between each treatment for each cow. Sufficient time between different feeding treatments was allowed to permit normalization of each cow before being switched to a different treatment.

The cows were blocked by milk production, based upon the level of milk production by individual cows, after producing at least 80 pounds of milk. After being blocked by milk production, the cows were randomly allotted to the four different feeding treatments. In these examples and comparative examples, none of the cows were given any recombinant bovine somatotropin (bST). The composition of the rations used in Examples 3 and 4 and in Comparative Examples 3 and 4 are shown in Table 13 below:

TABLE 13

| | WEIGHT PERCENT DRY BASIS)* | | | |
|---|---|---|---|---|
| INGREDIENT | Comparative Example 3 (Control) | Comparative Example 4 Roasted Regular Soybeans | Example 3 Roasted High Oleic Soybeans | Example 4 NEB High Oleic Soybeans |
| alfalfa haylage | 13 | 29 | 29 | 29 |
| alfalfa hay | 13 | 7 | 7 | 7 |
| corn silage | 26 | 20 | 20 | 20 |
| corn, cracked | 18.8 | 24.9 | 24.9 | 24.9 |
| roasted regular soybeans | 0 | 16.9 | 0 | 0 |
| roasted high oleic soybeans | 0 | 0 | 16.9 | 0 |
| non-enzymatically browned high oleic soybeans | 0 | 0 | 0 | 16.9 |
| SurePro ® bypass protein | 2.6 | 0 | 0 | 0 |
| soybean meal (48% crude protein) | 7.8 | 0 | 0 | 0 |
| whole cottonseed | 4.2 | 0 | 0 | 0 |
| QLF ® 4-199 formula feed | 4.7 | 0 | 0 | 0 |
| wheat midds | 1.9 | 0 | 0 | 0 |
| soy hulls | 1.1 | 0 | 0 | 0 |
| dried distiller's grain w/solubles | 1.9 | 0 | 0 | 0 |
| molasses | 0.5 | 0 | 0 | 0 |
| Megalac ® fat base | 0.9 | 0 | 0 | 0 |
| other minor ingredients** | 3.7 | 2.14 | 2.14 | 2.14 |

*based upon the total weight of the feed composition
**includes salt, vitamins, and minerals Table 14 below includes a summary of particular nutrients present in the rations of Examples 3–4 and Comparative Examples 3–4:

TABLE 14

| | WEIGHT PERCENT (DRY BASIS)* | | | |
|---|---|---|---|---|
| NUTRIENT | Comparative Example 3 (Control) | Comparative Example 4 (Roasted Regular Soybeans) | Example 3 (Roasted High Oleic Soybeans) | Example 4 (NEB) High Oleic Soybeans) |
| crude protein | 18.2 | 18.2 | 18.2 | 18.2 |
| $NE_L$ (Mcal/pound) | 0.72 | 0.74 | 0.74 | 0.74 |
| acid detergent soluble fiber (ADF) | 19 | 19 | 19 | 19 |
| neutral detergent soluble fiber (NDF) | 28.8 | 29.3 | 29.3 | 29.3 |
| fat | 3.3 | 6.2 | 6.2 | 6.2 |
| calcium | 1.06 | 1.03 | 1.03 | 1.03 |
| phosphorus | 0.47 | 0.45 | 0.45 | 0.45 |

*based upon the total weight of the feed composition

The various rations were placed in the troughs of the cattle once daily in the morning. Then, the treatment ration of Comparative Example 3, the treatment ration of Comparative Example 4, the treatment ration of Example 3, and the treatment ration of Example 4, respectively, were lightly mixed in front of the cows six times per day to encourage additional feed ingestion by the cattle.

Leftover rations from the previous day's feeding were collected from each feeding trough and weighed prior to feeding the test cattle the next day. The cows received a sufficient amount of the particular treatment ration to ensure that at least about 10 weight percent of the various treatment rations, based upon the amount of the particular treatment ration provided at the beginning of each day, remained per day for each test cow. Feed refusals were measured daily, and water was supplied ad libitum. Each test cow received routine care and management consistent with appropriate recommendations in the Guide for the Care and Use of Agricultural Animals and Agricultural Research and Teaching (1st edition, March 1988).

The test period for each treatment regimen lasted 21 days. The first seven days of each treatment regimen were used as a transition period and samples were collected for analysis during the last fourteen days of the test period. Each cow was milked three times daily and the weight of produced milk was recorded at each milking. Duplicate milk samples were taken twice weekly (⅓ of the volume from each milking sample was collected to form each duplicate sample) and will be analyzed for protein, fat, lactose, and total solids, in accordance with the property determination and characterization techniques presented above. These results are presently in-process and are therefore not available as of the time this document was prepared.

Milk was collected from cows undergoing each of the test regimens and separately compiled into milk samples that were batch processed in a Hobart mixer to form butter. The temperature of the milk samples in the Hobart mixer were cooled to about 60° F. during processing to form the butter. Data profiling the fatty acid content of the various butters that were produced based upon the various treatment regimens is presented in Table 15 below:

TABLE 15

Mean Values of Individual Fatty Acid Concentrations For Butter Made From Milk Produced on Day 7 through Day 21 of the 21 Day Test Period

WEIGHT PERCENT (DRY BASIS)**

| FATTY ACID* | Comparative Example 3 (Control) | Comparative Example 4 (Roasted Regular Soybeans) | Example 3 (Roasted High Oleic Soybeans) | Example 4 (NEB High Oleic Soybeans) |
|---|---|---|---|---|
| Butyric Acid (C4:0) | 2.9 | 2.6 | 3.3 | 2.9 |
| Caproic Acid (C6:0) | 1.9 | 1.9 | 2.1 | 1.9 |
| Caprylic Acid (C8:0) | 0.9 | 1 | 1 | 1 |
| Capric Acid (C10:0) | 2.2 | 2.5 | 2.2 | 2.2 |
| Lauric Acid (C12:0) | 2.5 | 2.9 | 2.4 | 2.5 |
| Myristic Acid (C14:0) | 10.1 | 11.1 | 10.1 | 9.8 |
| Myristoleic Acid (C14:1) | 0.8 | 0.8 | 0.5 | 0.6 |
| Palmitic Acid (C16:0) | 31.4 | 27.6 | 26.6 | 23.7 |
| Palmitoleic Acid (C16:1) | 1.5 | 1.1 | 1.2 | 1 |
| Stearic Acid (C18:0) | 13 | 13 | 14.7 | 14.4 |
| Trans-isomer of Oleic Acid (C18:1) | 2.9 | 2.2 | 2.5 | 3 |
| Cis-isomer of Oleic Acid (C18:1) | 24.3 | 25.3 | 28.3 | 32.4 |
| Oleic Acid (C18:1)*** | 27.2 | 27.5 | 30.8 | 35.4 |
| Trans-isomer of Linoleic Acid (C18:2) | 0.8 | 0.6 | 0.7 | 0.7 |
| Cis-isomer of Linoleic Acid (C18:2) | 2.6 | 4.6 | 2.1 | 1.7 |
| Linoleic Acid (C18:2)**** | 3.4 | 5.2 | 2.8 | 2.4 |
| Linolenic Acid (C18:3) | 0.4 | 0.8 | 0.6 | 0.5 |
| Other | 1.8 | 1.7 | 1.7 | 1.7 |

*Analysis was conducted by the Land O'Lakes Analytical Lab (results based on one sample of butter)
**Based upon the total weight of all fatty acids contained in the butter
***Determined by adding the values obtained for the cis-isomer and trans-isomer of Oleic Acid (C18:1)
****Determined by adding the values obtained for the cis-isomer and trans-isomer of Linoleic Acid (C18:2)

Also, details about the solid fat index, and the saturated fatty acid content versus the unsaturated fatty acid content, as well as, the free fatty acid value of the butter derived from milk produced by cows undergoing different feeding regimens is reproduced in Table 16 below.

TABLE 16

Mean Values of Individual Fatty Acid Concentrations For Butter Made From Milk Produced on Days 7–21 of the 21 Day Test Period

| BUTTER CHARACTERISTIC | Temperature | Comparative Example 3 (Control) | Example 3 (Roasted High Oleic Soybeans) | Example 4 (NEB High Oleic Soybeans) |
|---|---|---|---|---|
| Unsaturated Fatty Acid* (weight %)*** | N/A | 27.3 | 31.0 | 34.6 |
| Saturated Fatty Acid** (weight %)*** | N/A | 44.0 | 39.1 | 36.0 |
| Free Fatty Acid Value | N/A | 0.61 | 0.54 | 0.45 |
| Solid Fat Index (weight % solid fat remaining*) | 50° F. | 31.8 | 27.8 | 21.0 |
| | 70° F. | 12.7 | 10.0 | 7.2 |
| | 80° F. | 0 | 7.5 | 4.9 |
| | 92° F. | 0 | 2.5 | 1.0 |
| | 104° F. | 0 | 0 | 0 |

*Total Concentration of C12:0, C14:0, and C16:0 in the butter
**Total Concentration of C18:1 (cis-isomer only), C18:2 (cis-isomer only, and C18:3 in the butter
***Based upon the total weight of the butter The fatty acid profiles for butter made from milk produced during the three different treatment regimens in Comparative Examples 3 and 4 and Example 3 are not directly comparable to the fatty acid profiles for butter made from milk produced during the three different treatment regimens of Comparative Example 1 and Examples 1 and 2, respectively. Indeed, variations between the fatty acid profile of the butter derived from milk produced by cows receiving the three different treatment regimens in Comparative Examples 3 and 4 and Example 3 would be expected, versus the fatty acid profile of the butter derived from milk produced by cows receiving the three different treatment regimens of Comparative Example 1 and Examples 1 and 2, respectively.

First, the control ration that was used as all or part of the treatment ration in Comparative Examples 3 and 4 and Example 3 differed in composition somewhat from the composition of the control ration used as part or all of the feed in Example 2 and Comparative Examples 1–2. Second, the cows in Comparative Examples 3 and 4 and Example 3 were in early lactation (60 to 65 days initially), whereas the cows in Example 2 and Comparative Examples 1–2 were in mid-lactation to late lactation (120 to 250 days, initially). Also, all of the cows used in Comparative Examples 3 and 4 and Example 3 were multiparous, whereas some of the cows used in Example 2 and Comparative Examples 1–2 were primiparous. Finally, none of the cows used in Comparative Examples 3 and 4 and Example 3 received any recombinant bovine somatotropin (bST), whereas some of the cows used in Example 2 and Comparative Examples 1–2 did receive recombinant bovine somatotropin (bST). Similar comments apply with respect to the solid fat indexes of the butter derived from milk produced by cows receiving the three different treatment regimens in Comparative Examples 3 and 4 and Example 3 versus the solid fat index of the butter derived milk produced by cows receiving the three different treatment regimens of Comparative Example 1 and Examples 1 and 2.

The data in Table 15 demonstrate that non-enzymatically browned high oleic soybeans (Example 4) caused cows to produce milk that yielded butter with 32.4 weight percent of the cis-isomer form of oleic acid versus the concentration of the cis-isomer form of oleic acid of 24.3 weight percent in butter derived from milk produced by cows fed only the control ration (Comparative Example 3). On the other hand, the concentration of cis-isomer oleic acid in butter derived from milk produced by cattle fed roasted high oleic soybeans (Example 3) only increased to 28.3 weight percent as compared to the concentration of cis-isomer oleic acid of 24.3 weight percent in butter derived from milk produced by cattle fed only the control ration (Comparative Example 3). Thus, as compared to the concentration of cis-isomer oleic acid of 24.3 weight percent in butter derived from milk produced by cows fed only the control ration feeding, non-enzymatically browned high oleic soybeans caused an increase of 8.1 weight percent of cis-isomer oleic acid in butter versus the increase of 4.0 weight percent of cis-isomer oleic acid in butter based on feeding roasted high oleic soybeans Also, the concentration of undesirable palmitic acid (C16:0) decreased by a larger percentage in butter derived from the non-enzymatically browned high oleic soybean trial (Example 4) than for butter derived from the roasted high oleic soybean trial (Example 3), as compared to the trial that excluded high oleic soybeans (Comparative Example 3). On the other hand, the concentration of tranis-isomer of oleic acid remained relatively constant between the cows fed non-enzymatically browned high oleic soybeans (Example 4), versus cows fed only the control ration (Comparative Example 3).

Initial test results did point to increased softness for butter derived from milk produced during feeding of the roasted regular soybeans of Comparative Example 4, as compared to the softness of butter derived from milk produced during feeding of roasted high oleic soybeans of Example 3. However, these are early test results that have not been subjected to statistical analysis because the results are based on data insufficient to support statistical analysis.

Furthermore, the apparent increased softness for butter derived from milk produced during feeding of the roasted regular soybeans of Comparative Example 4, as compared to the softness of butter derived from milk produced during feeding of the roasted high oleic soybeans of Example 3 is inconsistent with the oleic acid data of Table 13. Oleic acid concentration in milk correlates fairly well to the relative softness (SFI) of butter that is based on a particular milk. Therefore, since the oleic acid concentration of milk produced by cows fed roasted regular soybeans (Comparative Example 4) is close to the oleic acid concentration of milk produced by cows fed the control feed (Comparative Example 3) and is substantially less than the oleic acid concentration of milk produced by cows fed roasted high oleic soybeans (Example 3), it reasonably follows that butter derived from milk produced by cows fed roasted regular soybeans (Comparative Example 4) should be about as soft as butter derived from milk produced by cows fed the control feed (Comparative Example 3) and should be significantly less soft than butter derived from milk produced by cows fed roasted high oleic soybeans (Example 3).

Significantly, the solid fat index data presented in Table 16 does demonstrate that the butter derived from milk produced by cows fed non-enzymatically browned high oleic acid (Example 4) was substantially softer than the butter derived from milk produced by cows fed only the control ration (Comparative Example 3) and was even quite a bit softer than butter derived from milk produced by cows fed roasted high oleic soybeans (Example 3). Though statistical analysis has not been conducted on this data of Table 16, this data is fully supported by the data of Table 15 that shows substantially increased levels of oleic acid in milk produced by cows fed non-enzymatically browned high oleic soybeans (Example 4), as compared to the concentration of oleic acid in milk produced by cows fed roasted high oleic soybeans (Example 3) and as compared to the concentration of oleic acid in milk produced by cows in (Comparative Examples 3 and 4) that were not fed any roasted high oleic soybeans or any non-enzymatically browned high oleic soybeans.

Although the present invention has been described with reference to preferred embodiments, workers skilled in the art will recognize that changes may be made in form and detail without departing from the spirit and scope of the invention.

What is claimed is:

1. A method of enhancing the oleic acid content of milk produced by a ruminant, the method comprising:

processing a high oleic material to form a ruminally-protected high oleic material that is resistant to degradation in the rumen of the ruminant;

orally feeding the ruminally-protected high oleic material to the ruminant; and milking the ruminant to produce milk, the concentration of fat in the milk produced by the ruminant fed the ruminally-protected high oleic material being greater than the concentration of fat in milk produced by the ruminant when fed the high oleic material without ruminally protecting the high oleic material.

2. The method of claim 1 wherein processing the high oleic material to render the high oleic material resistant to degradation in the rumen of the ruminant comprises roasting the high oleic material.

3. The method of claim 1 wherein processing the high oleic material to render the high oleic material resistant to degradation in the rumen of the ruminant comprises non-enzymatically browning the high oleic material.

4. The method of claim 1, the method further comprising orally feeding other feed components to the ruminant along with the ruminally-protected high oleic material, the other feed components selected from the group consisting of water, oilseed, beans, grain, plant-based oil, plant-based meal, animal-based meal, plant-based haylage, plant-based silage, plant-based syrup; fatty acids; formula feed; vitamins, minerals, and any mixture of any of these.

5. The method of claim 1 wherein the high oleic material comprises oil, oleic acid present in the oil at a concentration of at least about 50 weight percent, based upon the total weight of the oil in the high oleic material.

6. The method of claim 1 wherein the high oleic material comprises oil, oleic acid present in the oil at a concentration of at least about 75 weight percent, based upon the total weight of the oil in the high oleic material.

7. The method of claim 1 wherein the high oleic material comprises oil, oleic acid present in the oil at a concentration of at least about 80 weight percent, based upon the total weight of the oil in the high oleic material.

8. The method of claim 1, the method further comprising:

processing the milk to form butter, the solid fat content of the butter at 50° F. being about 21 weight percent, or less, based on the total weight of the butter.

9. The method of claim 1 wherein the weight rate of production of milk produced by the ruminant fed the ruminally-protected high oleic material is greater than the weight rate of milk production by the ruminant when fed the high oleic material without ruminally protecting the high oleic material.

10. The method of claim 1 wherein the high oleic material is high oleic oilseed.

11. The method of claim 1 wherein the high oleic material is high oleic soybean.

12. A method of feeding a ruminant, the method comprising:

ruminally protecting a high oleic material to form a ruminally-protected high oleic material that is resistant to degradation in the rumen of the ruminant, wherein ruminally protecting the high oleic material comprises roasting the high oleic material; and orally feeding the ruminally-protected high oleic material to the ruminant.

13. A method of producing a dairy product, the method comprising:
processing the milk of claim 1 to produce the dairy product.

14. The method of claim 13 wherein the dairy product is selected from the group consisting of butter, cheese, sour cream, whipping cream, and yogurt.

15. A feed composition, the feed composition comprising:
a ruminally-protected high oleic material that is resistant to degradation in the rumen of the ruminant, the ruminally-protected high oleic material comprising ruminally-protected high oleic oilseed; high oil corn; high oleic corn; or any combination of these.

16. The feed composition of claim 15, the feed composition further comprising other feed components that are selected from the group consisting of water, oilseed, beans, grain, plant-based oil, plant-based meal, animal-based meal, plant-based haylage, plant-based silage, plant-based syrup; fatty acids; formula feed; vitamins, minerals, and any mixture of any of these.

17. The feed composition of claim 15 wherein the ruminally-protected high oleic material comprises roasted high oleic material.

18. The food composition of claim 17 wherein the roasted high oleic material comprises roasted high oleic soybeans.

19. The feed composition of claim 15 wherein the ruminally-protected high oleic material comprises non-enzymatically browned high oleic material.

20. The food composition of claim 19 wherein the non-enzymatically browned high oleic material comprises non-enzymatically browned high oleic soybeans.

21. The feed composition of claim 15 wherein the feed composition comprises: the ruminally-protected high oleic material; and the high oil corn or the high oleic corn.

22. Milk, the milk comprising at least about 3.5 weight percent fat, based on the total weight of the milk, the milk produced by a ruminant fed a ruminally-protected high oleic material.

23. The milk of claim 22 wherein the milk comprises at least about 26.5 weight percent of the cis-isomer form of oleic acid, based on the total weight of all fatty acids in the milk.

24. The milk of claim 22 wherein the ruminally-protected high oleic material comprises ruminally-protected high oleic oilseed.

25. The milk of claim 22 wherein the ruminally-protected high oleic material comprises ruminally-protected high oleic soybeans.

26. Butter, the butter derived from the milk of claim 22.

27. A method of producing milk, the method comprising:
feeding ruminally-protected high oleic material to a ruminant, the ruminally-protected high oleic material resistant to degradation in the rumen of the ruminant; and
milking the ruminant to produce milk, the milk comprising at least about 26.5 weight percent of the cis-isomer form of oleic acid, based on the total weight of all fatty acids in the milk.

28. The method of claim 27 wherein the ruminally-protected high oleic material comprises ruminally-protected high oleic oilseed.

29. The method of claim 27 wherein the ruminally-protected high oleic oilseed comprises ruminally-protected high oleic soybeans.

30. Butter, the butter derived from the milk produced by the method of claim 27.

31. A method of enhancing the oleic acid content of milk produced by a ruminant, the method comprising:
roasting a high oleic material to form a ruminally-protected high oleic material that is resistant to degradation in the rumen of the ruminant;
feeding the ruminally-protected high oleic material to the ruminant; and
milking the ruminant to produce milk.

32. A method of enhancing the oleic acid content of milk produced by a ruminant, the method comprising:
non-enzymatically browning a high oleic material to form a ruminally-protected high oleic material that is resistant to degradation in the rumen of the ruminant;
feeding the ruminally-protected high oleic material to the ruminant; and
milking the ruminant to produce milk.

33. A method of enhancing the oleic acid content of milk produced by a ruminant, the method comprising:
processing a high oleic material to form a ruminally-protected high oleic material that is resistant to degradation in the rumen of the ruminant;
feeding the ruminally-protected high oleic material to the ruminant; and
milking the ruminant to produce milk, the weight rate of production of milk produced by the ruminant fed the ruminally-protected high oleic material being greater than the weight rate of milk production by the ruminant when fed the high oleic material without ruminally protecting the high oleic material.

34. A method of producing milk, the method comprising:
feeding a ruminally-protected high oleic material to a ruminant, the ruminally-protected high oleic material resistant to degradation in the rumen of the ruminant; and milking the ruminant to produce milk, the milk comprising at least about 3.5 weight
percent fat, based on the total weight of the milk.

35. The method of claim 34 wherein the milk comprises at least about 26.5 weight percent of the cis-isomer form of oleic acid, based on the total weight of all fatty acids in the milk.

36. A method of feeding a ruminant, the method comprising:
non-enzymatically browning a high oleic material to form a ruminally-protected high oleic material that is resistant to degradation in the rumen of the ruminant; and
feeding the ruminally-protected high oleic material to the ruminant.

37. A method of feeding a ruminant, the method comprising:
ruminally protecting a high oleic material to form a ruminally-protected high oleic material that is resistant to degradation in the rumen of the ruminant; and
feeding the ruminally-protected high oleic material to the ruminant, consumption of the ruminally-protected high oleic material effective to support production of a first milk by the ruminant, the first milk having a first fat concentration, the first fat concentration greater than a second fat concentration in a second milk that is producible by the ruminant upon consumption by the ruminant of the high oleic material that has not been ruminally protected.

38. A method of feeding a ruminant, the method comprising:
ruminally protecting a high oleic material to form a ruminally-protected high oleic material that is resistant to degradation in the rumen of the ruminant; and feeding the ruminally-protected high oleic material to the ruminant, consumption of the ruminally-protected high oleic material effective to support production of milk by the ruminant at a first rate, the first rate greater than a second rate of milk production that is achievable by the ruminant upon consumption by the ruminant of the high oleic material that has not been ruminally protected.

* * * * *

UNITED STATES PATENT AND TRADEMARK OFFICE
CERTIFICATE OF CORRECTION

PATENT NO. : 6,242,013 B1
DATED : June 5, 2001
INVENTOR(S) : Cindie M. Luhman et al.

It is certified that error appears in the above-identified patent and that said Letters Patent is hereby corrected as shown below:

<u>Column 39,</u>
Line 25, delete "food", insert -- feed --
Line 30, delete "food", insert -- feed --

Signed and Sealed this

Seventh Day of May, 2002

Attest:

JAMES E. ROGAN
*Attesting Officer*     *Director of the United States Patent and Trademark Office*